US010054802B2

(12) United States Patent
Bishop et al.

(10) Patent No.: US 10,054,802 B2
(45) Date of Patent: Aug. 21, 2018

(54) TOPOLOGY GUIDED OCULAR LENS DESIGN

(71) Applicant: Eyedeal Scanning, LLC, Needham, MA (US)

(72) Inventors: Robert P. Bishop, Newton, MA (US); Michael T. Sullivan, Needham, MA (US); Steve Auger, Cohasset, MA (US)

(73) Assignee: Eydeal Scanning, LLC, Needham, MA (US)

( * ) Notice: Subject to any disclaimer, the term of this patent is extended or adjusted under 35 U.S.C. 154(b) by 0 days.

(21) Appl. No.: 15/634,631

(22) Filed: Jun. 27, 2017

(65) Prior Publication Data

US 2018/0107021 A1  Apr. 19, 2018

Related U.S. Application Data

(63) Continuation-in-part of application No. 15/216,897, filed on Jul. 22, 2016, which is a continuation of
(Continued)

(51) Int. Cl.
*G02C 7/02* (2006.01)
*G02C 7/04* (2006.01)
(Continued)

(52) U.S. Cl.
CPC .......... *G02C 7/027* (2013.01); *B24B 13/0025* (2013.01); *B29C 64/386* (2017.08);
(Continued)

(58) Field of Classification Search
CPC .......... G02C 7/027; G02C 7/024; G02C 7/04; G02C 7/047; G02C 7/048; G02C 7/049;
(Continued)

(56) References Cited

U.S. PATENT DOCUMENTS 5,114,628 A * 5/1992 Hofer .................... B23K 26/08
216/59
5,880,809 A * 3/1999 Lieberman ............. G02C 7/041
351/159.02
(Continued)

OTHER PUBLICATIONS

Xthona, A., "Optimizing Image Quality in the Radiologist's Field of Vision", Barco Healthcare, Nov. 3, 2015.
(Continued)

*Primary Examiner* — Jordan Schwartz
(74) *Attorney, Agent, or Firm* — VLP Law Group LLP

(57) ABSTRACT

A method and system for generating a three-dimensional model of a contact lens with a front and a back surface, in which the entire back surface consists of an array of independent data points shaped to conform to three-dimensional data provided by an ocular topographer. The sampling density is sufficiently high to characterize anomalies or injuries anywhere in the eye to optimize comfort and fit. The methods and systems also include modeling a scleral lens which rests either solely on the sclera, or straddles the limbus extending partially into the cornea is described. The resting surface conforms to the topology of the underlying ocular surface with topology guiding the design. Additional methods and systems model scleral lens optics without the use of trial lenses. The lens models can be used to machine or 3D print a lens that fits the patient. Such lenses benefit patients that suffer from dry eyes or whose eyes are not normally dry, but feel dry after wearing conventional contact lenses.

6 Claims, 22 Drawing Sheets

Related U.S. Application Data application No. 13/654,151, filed on Oct. 17, 2012, now Pat. No. 9,398,845, application No. 15/634,631, which is a continuation-in-part of application No. 15/345,637, filed on Nov. 8, 2016, which is a continuation of application No. 15/213,709, filed on Jul. 19, 2016, now Pat. No. 9,489,753.

(60) Provisional application No. 61/547,904, filed on Oct. 17, 2011.

(51) Int. Cl.

| | |
|---|---|
| *B29C 64/386* | (2017.01) |
| *B33Y 80/00* | (2015.01) |
| *B33Y 10/00* | (2015.01) |
| *B33Y 50/02* | (2015.01) |
| *B29C 64/393* | (2017.01) |
| *B29D 11/00* | (2006.01) |
| *B24B 13/00* | (2006.01) |

(52) U.S. Cl.
CPC ...... *B29C 64/393* (2017.08); *B29D 11/00086* (2013.01); *B29D 11/00105* (2013.01); *B29D 11/00951* (2013.01); *B33Y 10/00* (2014.12); *B33Y 50/02* (2014.12); *B33Y 80/00* (2014.12); *G02C 7/024* (2013.01); *G02C 7/04* (2013.01)

(58) Field of Classification Search
CPC ........ B29D 11/00105; B29D 11/00076; B29D 11/00086
See application file for complete search history.

(56) References Cited

U.S. PATENT DOCUMENTS

| | | | |
|---|---|---|---|
| 7,296,890 | B2 | 11/2007 | Svochak et al. |
| 7,862,176 | B2 | 1/2011 | Gemoules et al. |
| 9,016,863 | B2 | 4/2015 | Gemoules |
| 9,398,845 | B2 | 7/2016 | Bishop |
| 9,421,721 | B2 | 8/2016 | Gemoules |
| 9,465,991 | B2 | 10/2016 | Mei et al. |
| 9,489,753 | B1 | 11/2016 | Bishop et al. |
| 9,551,885 | B2 | 1/2017 | Sindt et al. |
| 2004/0223118 | A1* | 11/2004 | Jean ................. A61B 3/0058 351/200 |
| 2011/0112805 | A1* | 5/2011 | Lieberman ........ A61F 9/00804 703/1 |
| 2015/0088297 | A1* | 3/2015 | Gemoules ........ B29D 11/00961 700/160 |
| 2017/0082869 | A1 | 3/2017 | Sindt et al. |
| 2017/0181621 | A1* | 6/2017 | Catanzariti ........... A61B 3/107 |

OTHER PUBLICATIONS

Czajkowski, A., entitled "Specifying an Aspheric Surface," OPT 521—Report #2, Dec. 14, 2007.

sMap 3D, A Revolution in Scleral Lens Fitting, www.Visionary-Optics.com/sMap3D.

* cited by examiner

**Scleral Lens

100 = Lens Bearing Surface
101 = Scleral Lens
102 = Cornea
103 = Liquid Reservoir Patient 1
Two Small Injuries in Sclera Patient 2
Larger Injury in Sclera Patient 3
Injury Effecting Sclera and Cornea Patient 4
Injury Effecting Sclera and Cornea Images Compliments of Journal of American Medical Association (JAMA)
Ophthalmology Website
(prior art)

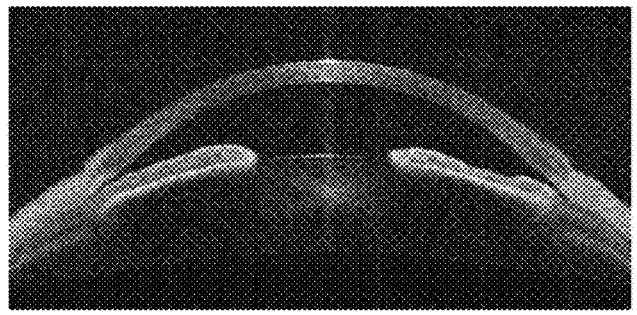

Single Sagittal Image of the Eye
Obtained Using Optical Coherent Tomography
Figure 3a

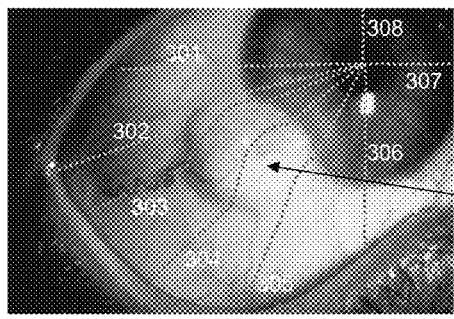

Figure 3b

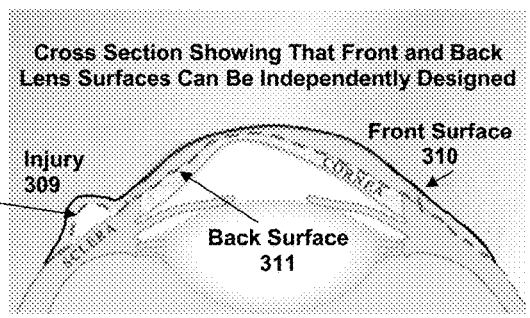

Figure 3c

Multiple Independent Meridians Per Quadrant Enable Back Lens Surface to Better Conform to Eye Surface Topology. Each Radial Meridian Can Have Different Independent Spatial Z Height Values.

Topography Data Used to Design Lens Back Surface in which the number of Meridians is Limited Only by the Spatial Resolution of the Topographer

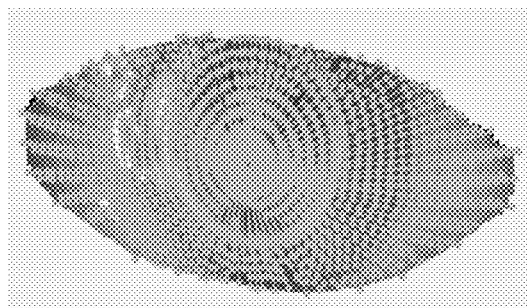

Motion Compensated Topography Data of a Patients Eye
Used to Design the Scleral Lens. Data Provided from the Bishop Scanner
Contains 120 Meridians with 37 Data Points Per Meridian for a Total of 4440
Measured Locations
Figure 3d

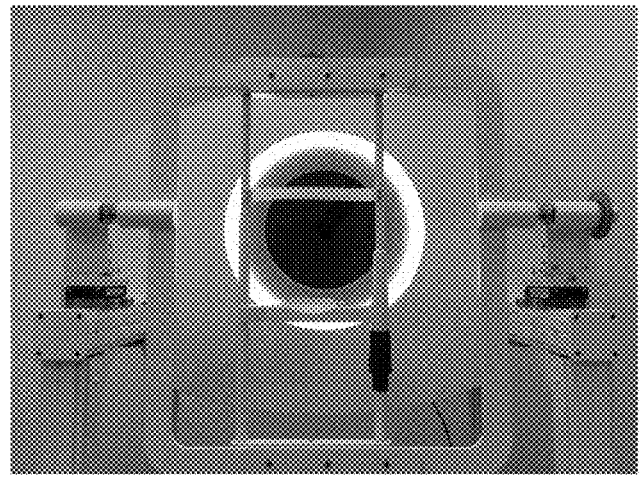
**Eye Topographer
Figure 4**
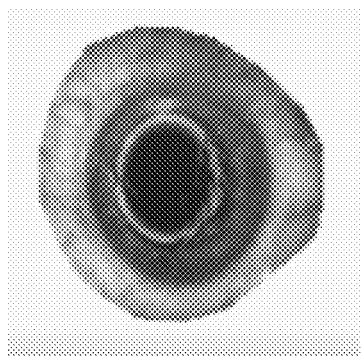 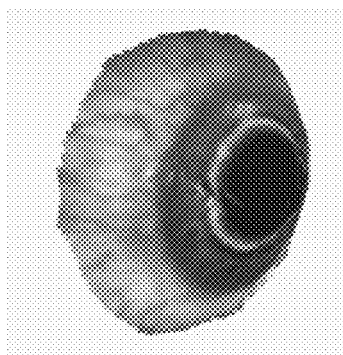 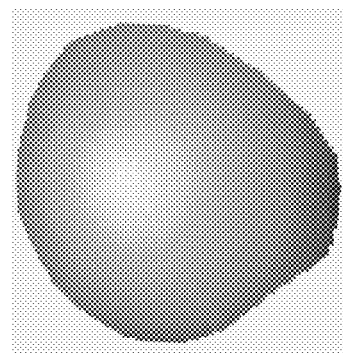
Front View
Figure 5a
Side View
Figure 5b
Topology Map
Height proportional to Intensity
Figure 5c
**Three-dimensional Scan of a Human Eye Obtained Using a Speculum
to Separate the Eyelids**

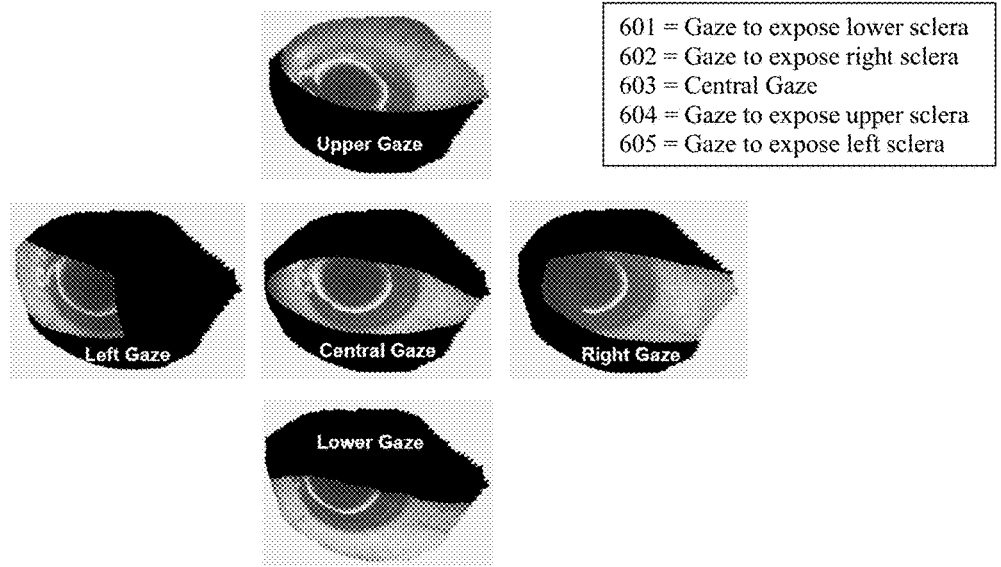

601 = Gaze to expose lower sclera
602 = Gaze to expose right sclera
603 = Central Gaze
604 = Gaze to expose upper sclera
605 = Gaze to expose left sclera To Scan Even Further Past The Eyelids Without the Use Of A Speculum Topology Data From Multiple Gazes Can be Stitched Together To Create The 3 Dimensional Model

Figure 6

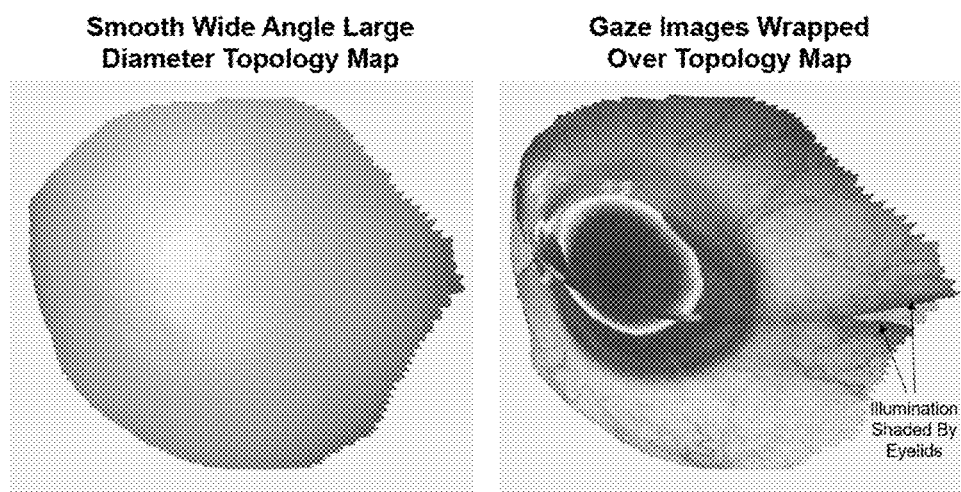

Figure 7a — Smooth Wide Angle Large Diameter Topology Map
Figure 7b — Gaze Images Wrapped Over Topology Map Intensity Variations At Gaze Image Boundaries Is Due To Eyelid Illumination Shading In The TV Images And Does Not Effect Reported Axial Heights Central Corneal and Scleral Data
Superimposed on Scanned Eye Central Corneal and Scleral Data
Superimposed on Topology Map

The Bearing Surface Landing Region Is Mapped Onto The Model

Bearing Surface Superimposed
on Scanned Eye

Bearing Surface Superimposed
on Topology Map

Central Corneal Topology And Corneal Elevation Is Measured To Design The Scleral Lens Vaulting Height

Central Corneal Surface Superimposed on Scanned Eye

Central Corneal Surface Superimposed on Topology Map

Side View Showing Lens Bearing Surface Shaped to Topology of Patient's Eye and Corneal Height Above Bearing Surface Scleral Lens with Vaulted Optics, Transition Region, and Bearing Surface
Designed to Follow Three-Dimensional Topology of Eye and Permit Flow of
Fluid In and Out of the Corneal Region Optical Configuration with Eye Glasses The optical configurations in Figures 12a and 12b
must create the same image on the retina Same Image
Formed on Retina Optical Configuration with Scleral Lens

Optical Configuration with Eyeglasses

The optical configurations in Figures 13a and 13b must create the same image on the retina Same Image Formed on Retina

Optical Configuration with Scleral Lens

**Optical Configuration with Eyeglasses

**Optical Configuration with Scleral Lens

The Scleral Lens design goal is to match rays 1412a to 1412b inside the eye
and match rays 1410a and 1410b outside the eye

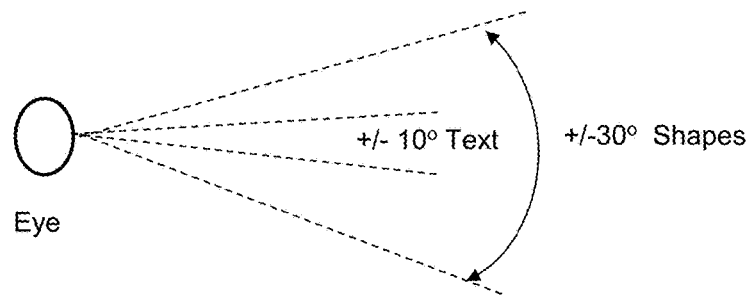

Visual Field of Eye at Fixed Gaze
Figure 15

Snell's Law: $I_i \sin\alpha_i = I_r \sin\alpha_r$

Where:  $I_i$ = index of refraction of the incident beam material
 $\alpha_i$ = angle of incidence of the incident beam relative to a perpendicular line drawn to the surface
 $I_r$ = index of refraction of the refracted beam material
 $\alpha_r$ = angle of incidence of the refracted beam relative to a perpendicular line drawn to the surface

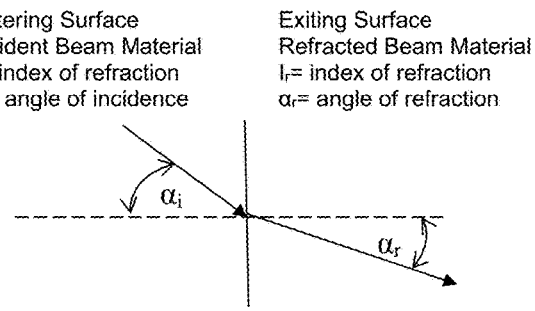

Snell's Law of Light Refraction
Figure 16

Snell's Law Applied to Air Corneal Transition

**When a Light Ray with an Incident Angle of 30° Enters the Cornea from Air
It is Bent from 30° to 21.3° A Difference of 8.7°**

**When a Light Ray with an Incident Angle of 30°
Enters the Cornea from Saline Solution It is
Bent from 30° to 29.02°
A Difference of only 0.98°**

Snell's Law Applied to Saline Solution - Corneal Transition

Enlarged Superposition of Figures 19a and 19b Showing How Well the Optical Rays From the Scleral Lens Design Match the Reference Ray Set From the Corrective Lens.

First Three-Dimensional Computer Model Corresponding to Figure 19a.

Second Three-Dimensional Computer Model Corresponding to Figure 19b

Superposition of Figures 21a and 21b showing how well the optical rays from the Scleral Lens
design match the Reference Ray Set from the corrective lens

Optical Configuration with No Eyeglasses

The optical configurations in Figures 23a and 23b must create the same image on the retina

Optical Configuration with Scleral Lens

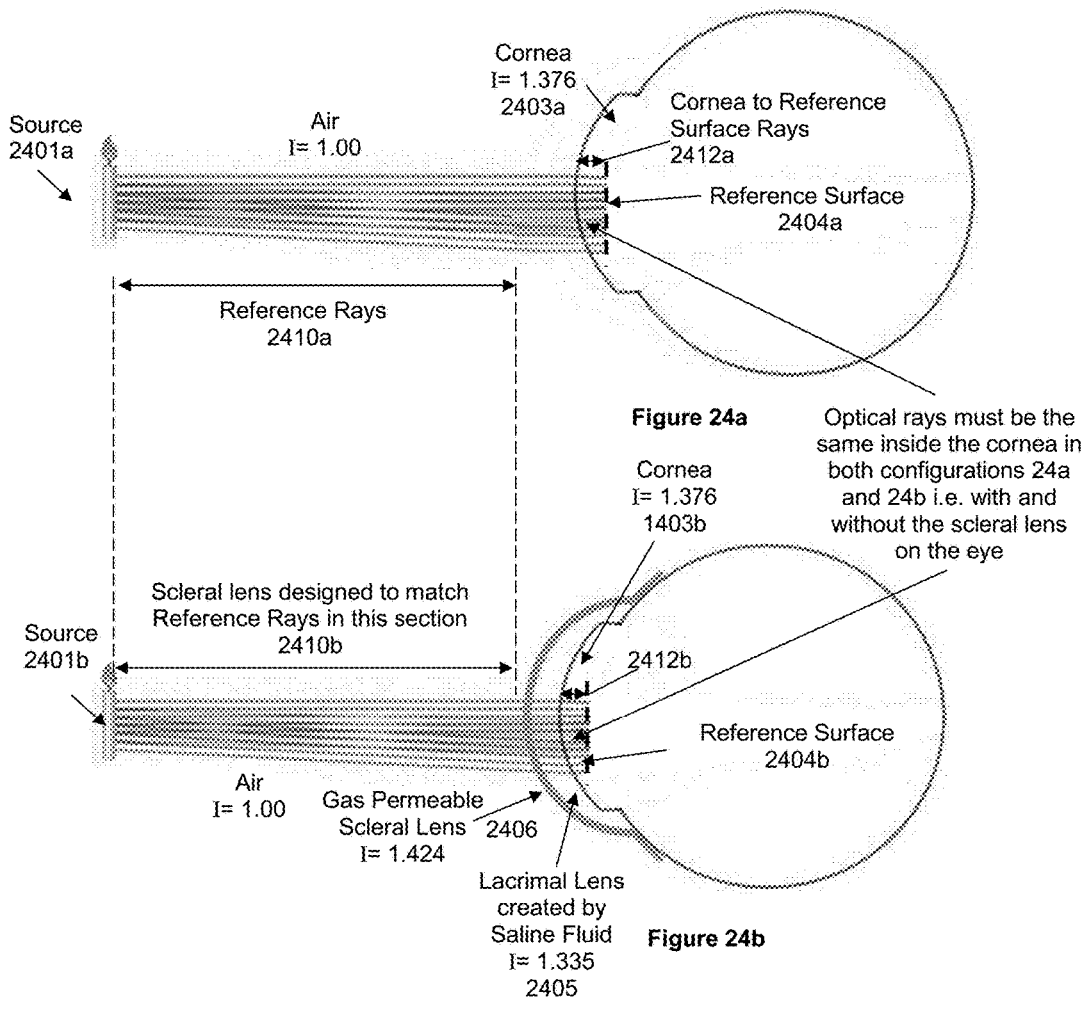

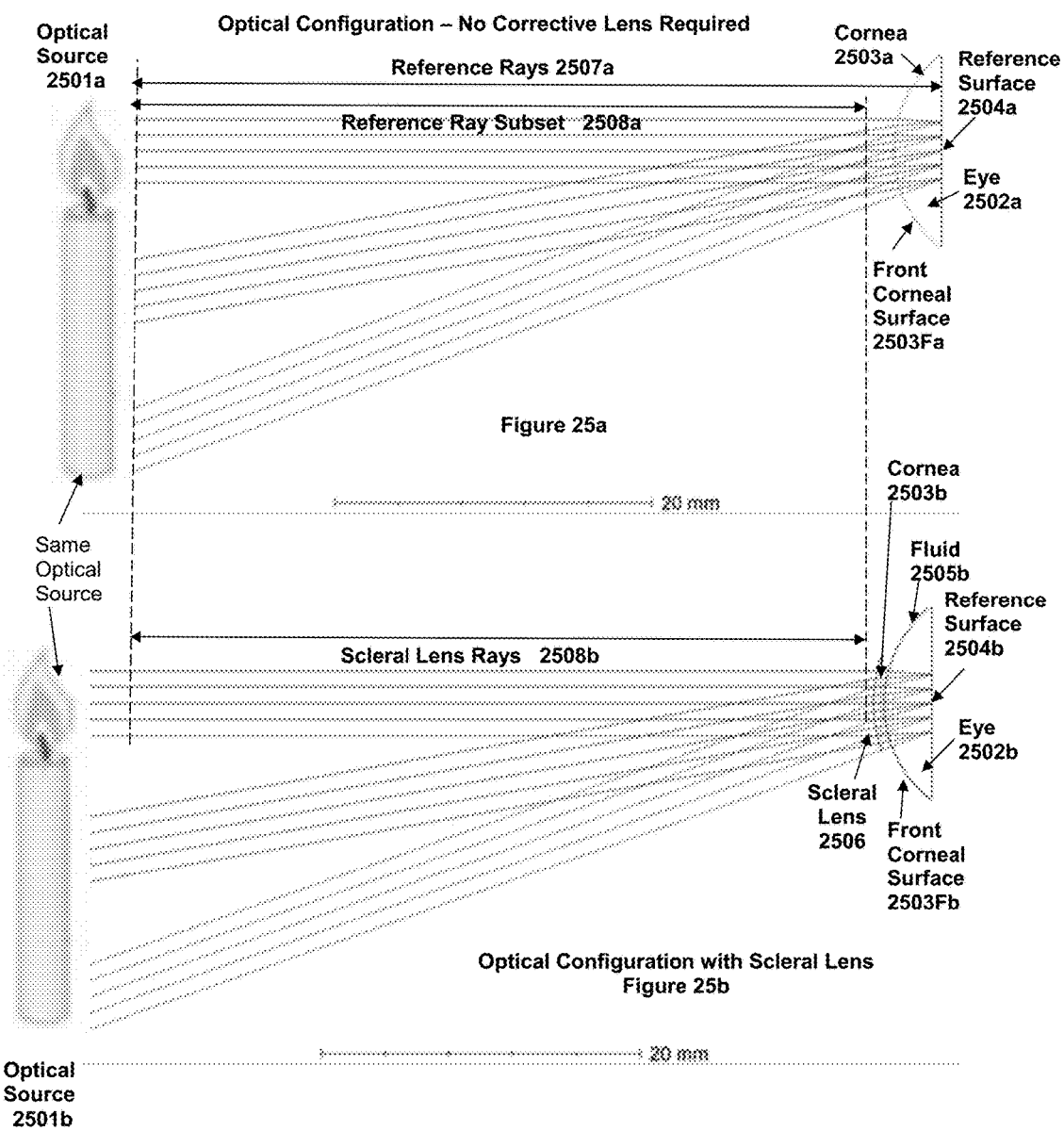

Enlarged Superposition of Figures 25a and 25b Showing How Well the Optical Rays From the Scleral Lens Design Match the Reference Ray Set Eye Only
First Three-Dimensional Computer Model Corresponding to Figure 25a.

Scleral Lens on Eye
Second Three-Dimensional Computer Model Corresponding to Figure 25b Superposition of Figures 27a and 27b showing how well the optical rays from the Scleral Lens design match the Reference Rays calculated prior to application of the scleral lens Block Diagram of System
2800

TOPOLOGY GUIDED OCULAR LENS DESIGN

CROSS-REFERENCE TO RELATED APPLICATIONS

This application is a continuation-in-part of co-pending U.S. patent application Ser. No. 15/216,897, filed Jul. 22, 2016, which was a continuation of U.S. patent application Ser. No. 13/654,151 filed Oct. 17, 2012 now issued as U.S. Pat. No. 9,398,845 which in turn claimed priority to U.S. Provisional Application No. 61/547,904 filed Oct. 17, 2011; and a continuation-in-part of co-pending U.S. patent application Ser. No. 15/345,637, filed Nov. 8, 2016, which was a continuation of U.S. patent application Ser. No. 15/213,709 filed Jul. 19, 2016 now issued as U.S. Pat. No. 9,489,753; and the disclosures of each of which incorporated herein by reference in their entirety below.

BACKGROUND

Scleral lenses have been used to restore sight to those with injured or diseased corneas and to relieve discomfort from dry eye disorders. The incidence of dry eyes in the general population is estimated to be 15%, of which nearly 2 in 10 have symptoms severe enough to significantly impact their quality of life. Globally, this corresponds to 3% of the worldwide population and approximately 9,240,000 severe dry eye patients in the United States alone.

In addition, there are millions of people whose eyes are not normally dry but feel dry after wearing conventional contact lenses for an extended period of time.

A scleral lens is a large contact lens that rests on the white scleral region of the eye and is vaulted over the cornea as shown in FIG. 1. The gap 103 between the back-interior surface of the lens and cornea is typically filled with saline solution which acts like a liquid bandage to soothe the thousands of nerves on the corneal surface. In some applications, medication can be added to, or replace, the saline solution to assist with healing an injured eye.

To ensure that the lens does not irritate the nerves on the scleral surface, the shape of the bearing surface 100, shown in FIG. 1, must match the unique three-dimensional shape of the patient's sclera, including the regions normally covered by the eyelids.

Unfortunately, there is currently no way to precisely measure scleral shape. As a result, to find a comfortable fitting lens, scleral lenses are manually selected from a set of up to 2000 trial lenses to find a suitable fit to the patient's scleral surface. This is an iterative, expensive, and time-consuming process which can take several weeks. If a close-fitting trial lens can be found, frequently it must be further modified to optimize fit.

If the patient has an abnormally shaped eye, due to an injury or disease for example, as shown in FIGS. 2a, 2b, 2c, 2d, fitting may not be possible because there is no trial lens that conforms to the shape of the irregular shaped bearing surface.

There is also a category of smaller diameter scleral lenses whose bearing surface lies on both sides of the limbus straddling the sclera and outermost regions of the cornea. For injured eyes, these lenses may be even more difficult to fit because they must conform to injuries in both the corneal and scleral regions of the bearing surface, as shown in FIGS. 2c and 2d.

Assuming a well-fitting trial lens can be found, the next step in the prior art approach is to determine the optical properties of the vaulted optics that needs to lie in front of the patient's cornea to properly focus light onto the retina.

It is important to emphasize that while a trial lens has no patient-specific vision correction optics, it must be placed on the patient's eye and worn to enable design of the optics because the fluid (typically saline) that lies between the back surface of the scleral lens and front surface of the cornea; alters how light rays are bent at both the fluid-cornea and fluid-back-scleral-lens boundaries.

With the trial lens now in place, the doctor or eye care practitioner performs an optical refraction (i.e. places different known lenses in front of the trial scleral lens) to determine the optical power of the scleral lens optics.

Once the refraction is completed, then knowing the required optical power and the bearing surface shape of the best fitting trial lens, a patient specific custom scleral lens can now be manufactured.

A prior art attempt to measure scleral shape without iteratively interchanging trial lenses is described by Gemoules, U.S. Pat. No. 7,862,176 B2 entitled "Method of Fitting Rigid Gas-permeable Contact Lenses from High Resolution Imaging". Gemoules' fitting method is based on using a digital acquisition device to acquire a two-dimensional cross sectional sagittal image of the eye which includes the sclera, as shown in FIG. 3a. However, the eye is not two dimensional in shape, it is three-dimensional, as shown in FIGS. 5a, 5b and 5c, so a cross sectional image is a poor approximation to a three-dimensional shape. This limitation is further illustrated by the injured eye shown in FIG. 3b. FIG. 3b shows multiple independent meridians in a quadrant over an injured region to enable the back-lens surface to better conform to eye surface topology. Each radial meridian can have different independent spatial Z height values. The cross-sectional sagittal image shown in FIG. 3a could easily correspond to a scan taken across line 301-307 in FIG. 3b, which does not reveal the presence of the injury shown by scan lines 302, 303,304, and 305, such scan lines also referred to as meridians. In addition, and while not addressed by Gemoules, attempts to approximate the three-dimensional shape by acquiring multiple independent two-dimensional scans around the eye has failed in the past because the spatial position of the eye moves between scans.

Svochak, U.S. Pat. No. 7,296,890 B2 entitled "Contact Lens with Controlled Shape," presents means for creating a contact lens that sits on the cornea and whose back-surface shape is defined by four (4) base curves, effectively one curve per quadrant. This technique for designing a scleral lens bearing surface has multiple limitations. First, it cannot conform to small injuries, protrusions or irregular shapes within a region of a generally different shape, as shown in FIGS. 2a, 2b, 2c, and 2d herein. Second, the base curve of the cornea is almost always different from that of the sclera with the demarcation point being the limbus. A scleral lens that straddles both regions must conform to this complex change in curvature across the region boundaries (as illustrated in FIG. 10 at arrow 1003) and Svochak is only concerned with lenses conforming to the cornea. Third, the four-base-curve solution cannot follow all possible three-dimensional topology changes in an eye. If an eye or optimized well-fitting lens requires more than 4 base curves to define its shape, as for the injured eyes in FIGS. 2a-d, Svochak's method is not applicable.

Sindt, U.S. Pat. No. 9,551,885 B2 entitled "Prosthetic Lenses and Methods of Making the Same" describes methods of applying a foreign material to the surface of an eye to obtain a physical impression thereof. The impression is then used to determine the back surface of a lens. This procedure is highly invasive and may not be well tolerated by patients with sensitive eyes.

SUMMARY OF PREFERRED EMBODIMENTS

As a result, there is a need for a non-invasive method to design and manufacture a custom fitting scleral lens shaped to the surface of a patient's eye.

Given the limitations of the prior art, a first method is described to enable the design of a scleral lens bearing surface so that it follows the actual three-dimensional shape of the sclera, without the need of using trial lenses. The lens bearing or back surface that rests on the eye is described by a three-dimensional array of data points each representing an independently measured x, y, z location on the surface of the eye. This new capability is applicable for the design of any scleral lens, independent of whether the lens is to relieve dry eye symptoms or to restore sight to patients with injured or diseased corneas. Unlike Gemoules, who uses one sagittal image to create the back surface of the lens, or Svochak, who uses four base curves to create the lens back surface, in the approach described herein every data point on the lens bearing surface can correspond to a uniquely measured three-dimensional x, y, z value on the patient's eye. Unlike the prior art, lens design is not limited to four base curves, one per quadrant, and the maximum number of radial meridians used to design the lens is limited only by the spatial-resolution of the topographer and each meridian can be, and typically will be, different from each other, as shown in FIG. 3b. FIG. 3d is an actual three-dimensional, high-resolution, high density scan of a patient's eye showing the three-dimensional array of independently measured data points on the surface of the eye and the ability to conform to fine surface detail. FIG. 3d was obtained using the Bishop topographer shown in FIG. 4. FIG. 3c shows how this data can be used to make a contact lens whose back surface is shaped to the unique topology of a patient's eye.

A second method is described to enable the design of just the scleral lens optics without needing to perform a refraction with a scleral lens placed on the eye. This is applicable for those patients that already have good vision, or use eyeglasses or contacts to obtain good vision and want to wear a scleral lens to relieve dry eye symptoms or for any other reason.

A third method is described to enable the design of the entire scleral lens, including the bearing surface and optics without the need of a trial lens. In this implementation, the bearing surface of the patient specific scleral lens follows the true three-dimensional shape of the patient's eye without requiring the use of a trial lens to determine this shape. This is applicable for those patients that already have good vision, or use eyeglasses or contacts to obtain good vision and want to wear a scleral lens to relieve dry eye symptoms or for any other reason.

A fourth method enables the 3D printing of a lens designed using the methods described.

BRIEF DESCRIPTION OF THE DRAWINGS

FIG. 3a is a cross-sectional sagittal image of an eye;
FIG. 3b is an image of an injured eye with multiple independent meridians in a quadrant;
FIG. 3c is a cross section of a lens showing that the front and back surfaces can be independently designed;
FIG. 3d is a motion compensated scan of a human eye acquired by the Bishop scanner;
FIG. 4 is a picture of the Bishop Topographer;
FIG. 5a is a three-dimensional model of a human eye, showing the front view;
FIG. 5b is a three-dimensional model of a human eye, showing the side view;
FIG. 5c is a three-dimensional topology map of a human eye, showing the front view;
FIGS. 6, 7a and 7b show multiple gaze images of an eye stitched together to create a topology map and three-dimensional model of the entire eye;
FIG. 15 shows the visual field of an eye at a fixed gaze;
FIG. 16 describes Snell's Law;
FIG. 22a is the three-dimensional representation of FIG. 19a;
FIGS. 24a and 24b shows relationship between optical rays with and without a scleral lens on the eye;
FIGS. 25a and 25b show the first and second computer model required to design scleral lens optics;

FIG. 27a is the three-dimensional representation of FIG. 25a;

DETAILED DESCRIPTION OF THE PREFERRED EMBODIMENT

Historically, the three-dimensional shape of the scleral lens bearing surface was obtained through the use of trial lenses, as described above. However, new advances in eye topology scanners now provide a way to directly measure three-dimensional scleral shape. Topographers such as, for example, the one developed by Bishop et al., U.S. Pat. Nos. 9,398,845 and 9,489,753 (both of which are incorporated by reference herein), enable all regions of the sclera to be scanned in three dimensions, including the regions normally covered by the eyelids. A view of the Bishop Topographer is shown in FIG. 4, and more technical details concerning its operation are contained in the referenced patents. Furthermore, the Bishop Topographer compensates for eye motion during all scanning operations. FIG. 5 shows the three-dimensional topology scan of a human eye obtained using the Bishop Topographer. To expose the upper and lower scleral regions, a speculum was used to hold the eyelids open as the eye was scanned. FIG. 5a shows the resulting front view, FIG. 5b the resulting side view, and FIG. 5c a resulting contour map with intensity proportional to height. FIGS. 5a, b, c were all generated from a single 3 second scan of the eye.

If for any reason, it is not desirable to use a speculum, the Bishop Topographer can also acquire and stitch together multiple scans of the eye, each acquired with the eye at a different gaze to expose a different region of the sclera, as shown in FIG. 6. The topographer can then combine the scans into a single three-dimensional model from which the bearing surface can be extracted. The scanner compensates for all motion of the eye during and between scans. FIG. 7a shows the height contour map and FIG. 7b shows the three-dimensional model generated by stitching together the gaze scans shown in FIG. 6.

For the purpose of the following discussion, we will use the three-dimensional model of an eye and the topology map obtained using a speculum with the Bishop Topographer (U.S. Pat. No. 9,398,845) as shown in FIGS. 5 through 12. However, any topographer, whether it uses light triangulation, light interference, OCT technology, pattern projection, interferometry, or any other means to scan the eye that enables the scleral lens bearing region to be scanned in three dimensions, without introducing artifacts due to eye motion, can be used to implement the methods and systems described herein.

Figure 1:
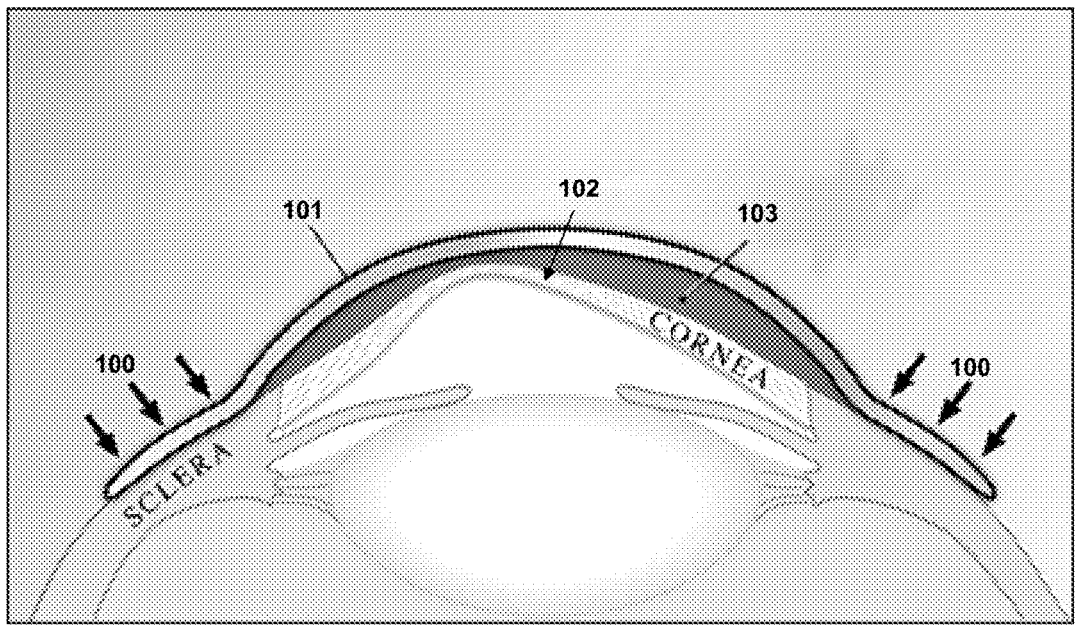
FIG. 1 shows the cross section of a scleral lens placed on an eye.
Figure 2A:
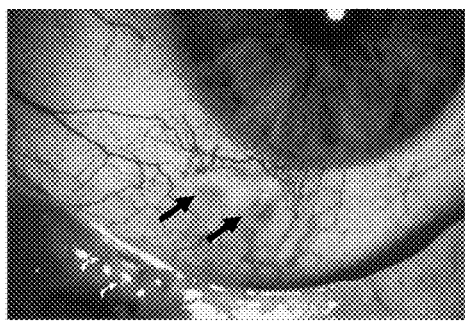
FIGS. 2a to 2d show injuries on the eye.
Figure 2B:
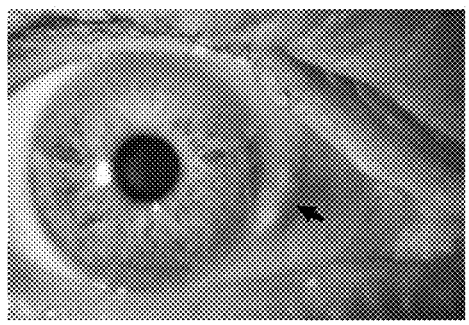
Figure 2C:
Figure 2D:
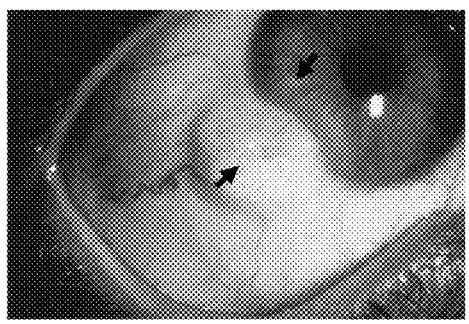
Figure 8A:
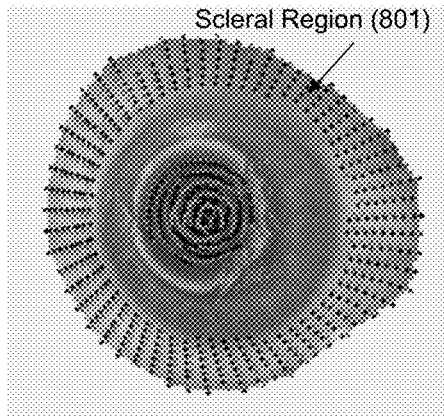
FIG. 8a shows central corneal and scleral data superimposed on a scanned eye.
Figure 8B:
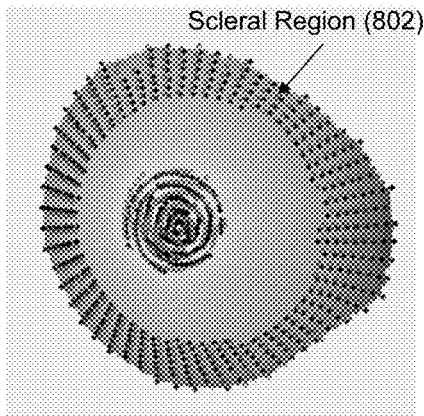
FIG. 8b shows central corneal and scleral data superimposed on a topology map of an eye.

To determine the scleral lens bearing surface the following steps are performed:

1. Use an ocular topographer, such as the Bishop Topographer, to measure the three-dimensional topology of the patient's eye in the region that will be used to design the back surface of the lens. FIGS. 8a and 8b are an example of the bearing region being in the sclera as shown by arrow 801 in FIG. 8a and arrow 802 in FIG. 8b. The topology information, obtained as a set of data points, provided must be free from motion blur to represent the true shape of the eye. As shown in FIGS. 8a and 8b, each data point represents an independently measured x, y, z location on the surface of the eye.

Figure 9A:
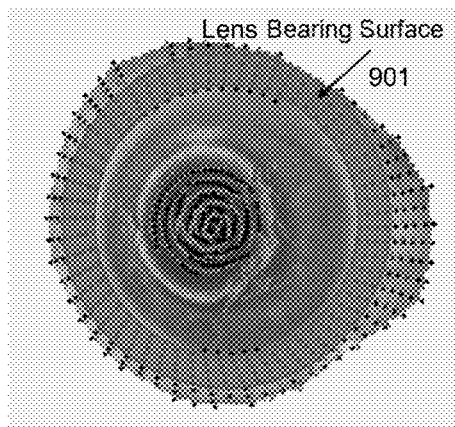
FIG. 9a shows the selected bearing surface of the eye superimposed on the three-dimensional model.
Figure 9B:
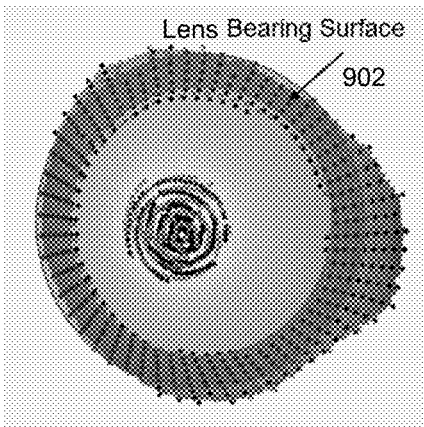
FIG. 9b shows the selected bearing surface of the eye superimposed on the topology map.
Figure 10A:
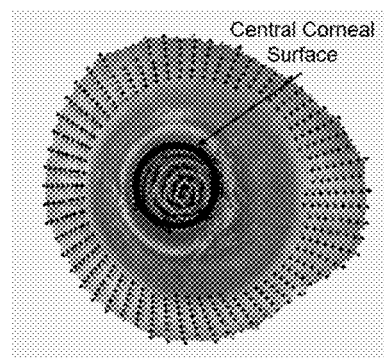
FIG. 10a shows the central corneal surface of the eye superimposed on the three-dimensional model.
Figure 10B:
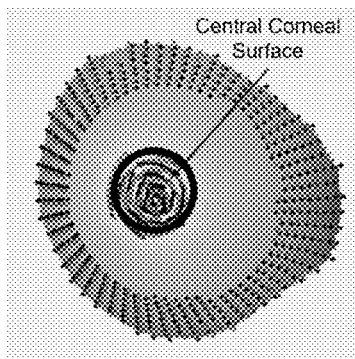
FIG. 10b shows the central corneal surface of the eye superimposed on the topology map.
Figure 10C:
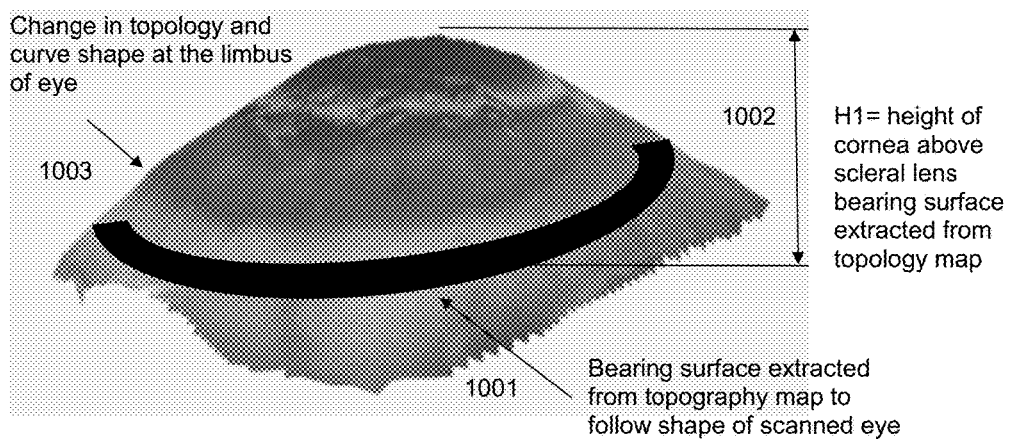
FIG. 10c is the side view of an eye model showing the lens bearing surface shaped to the topology of the eye.
Figure 11:
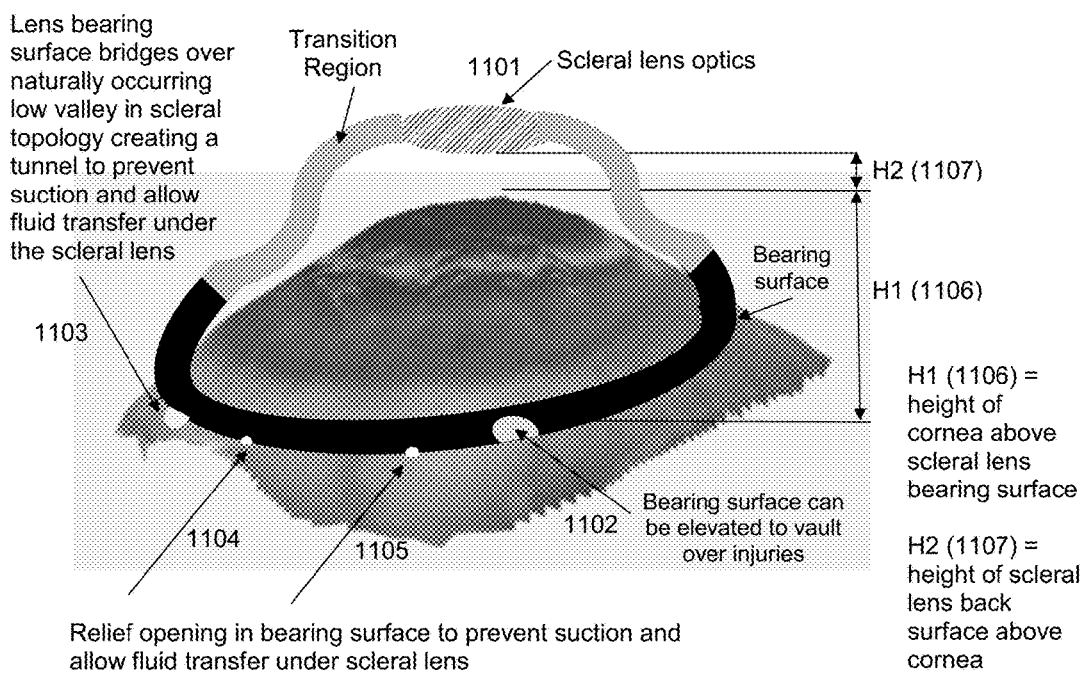
FIG. 11 shows a scleral lens with vaulted optics, transition region, and bearing surface.

2. Define the location, width, and size of the lens bearing surface on the eye. As an example, FIGS. 9a and 9b show the bearing surface residing in the sclera as indicated by arrow 901 in FIG. 9a, arrow 902 in FIG. 9b and arrow 1001 in FIG. 10c. However, the bearing surface can also straddle the cornea and sclera or contact the eye in any location. Create the back surface of the lens from the bearing surface information, so that it follows the actual three-dimensional topology of the eye with a high density of sample points within the entire 360 degree bearing region, as shown in FIGS. 9a and 9b. This method of design yields a back surface shaped like a molded impression of the eye, which may include injured and/or irregular regions on the bearing surface.

3. If the lens is to vault over the central corneal region, extract from a three-dimensional model, or three-dimensional topology map obtained from the topographer, the maximum height of the central corneal surface over the pupil relative to the scleral lens bearing surface, such as height H1 indicated by arrow 1002 in FIG. 10c.

4. Design the back surface of the scleral lens optics, indicated by 1101 in FIG. 11, to vault over the top of the cornea, creating a clearance distance 1107, so as to ensure that the back surface of the scleral lens does not touch the cornea. For a scleral lens that vaults over the cornea, clearing distances are typically in the range of 100 to 300 microns.

5. Locate scars or injuries in the scleral and/or corneal region, as shown in FIGS. 2a, 2b, 2c, and 2d, that could prevent the lens from properly and/or comfortably sitting on the eye. If necessary, elevate the back surface of the lens to vault over the injured areas as indicated by arrow 1102 in FIG. 11. It is important to ensure that the topographer has sufficient spatial resolution to detect such abnormalities. Such scars or injuries can be identified by an operator upon examination of a video camera image (also provided by the topographer), as shown in FIGS. 2a, 2b, 2c, 2d, 3b, and/or by examination of the three-dimensional topology data.

6. For a vaulted scleral lens that contains fluid between the cornea and central back surface of the lens, use any naturally occurring low valley or valleys in the eye topology under the lens bearing surface, as indicated by arrow 1103 and/or create at least one or more small raised gaps under the lens back surface indicated by arrows 1104 and 1105 to allow the free flow of tears in and out of the region covered by the lens. Such gaps also prevent excessive suction from forming between the lens and eye which if not prevented could make lens removal difficult. Such valleys can be identified upon manipulation and examination of the three-dimensional topology map, and or model, and or the video image.

While FIGS. 8 through 11 illustrate the lens back surface sitting on the sclera, this same technique for designing a lens back surface, in which:

the entire lens bearing region of the eye is described by a three-dimensional array of independently measured data points provided by an ocular topographer;

the spatial relationship between the data points is either compensated for eye motion during the scan and/or free of artifacts from motion blur;

the topology of the eye, in the bearing region, is extracted to create the back surface of the lens; and each data point of the lens back surface represents an independently measured x, y, z location on the surface of the eye, can be applied to any lens resting on any part of the eye.

With the lens bearing surface now designed, a method for designing scleral lens optics, without placing a series of trial lenses on the eye, will now be described.

Design of Patient Specific Scleral Lens Optics without the Use of Trial Lenses

If a patient wants to wear a scleral lens to relieve dry eye or contact lens induced dry eye symptoms, and has good vision defined as producing a sharp image on their retina without the need for eyeglasses or corrective lenses, then the scleral lens must be designed to maintain the same quality of vision when applied to the eye as existed prior to its application.

Figure 12A:
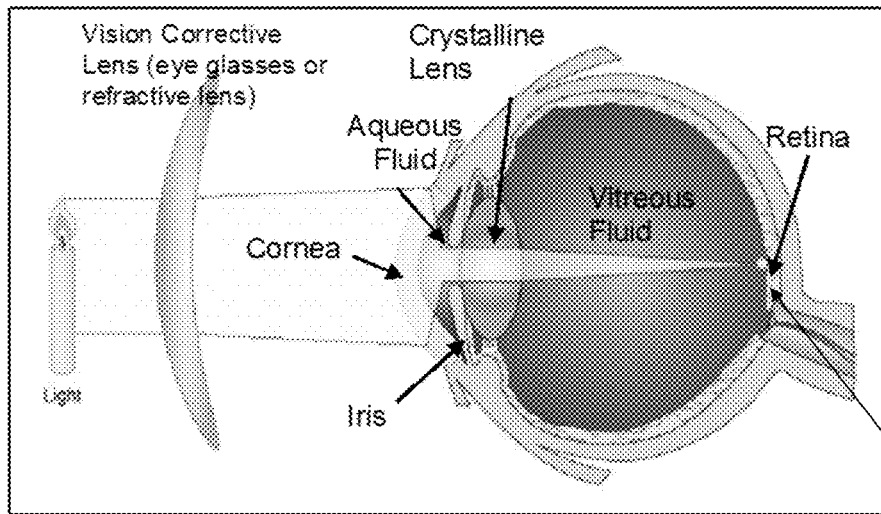
FIG. 12a shows an eye with corrective eyeglasses.
Figure 12B:
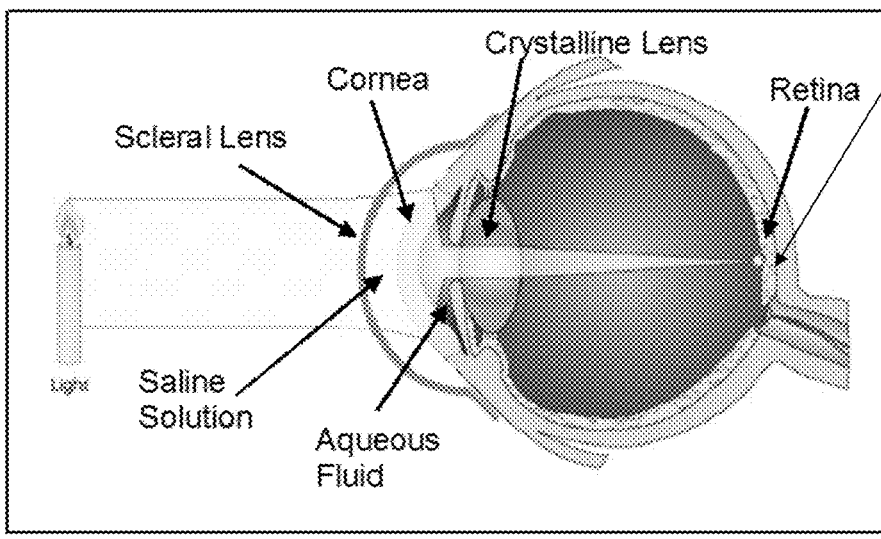
FIG. 12b shows a scleral lens placed on the eye.
Figure 13A:
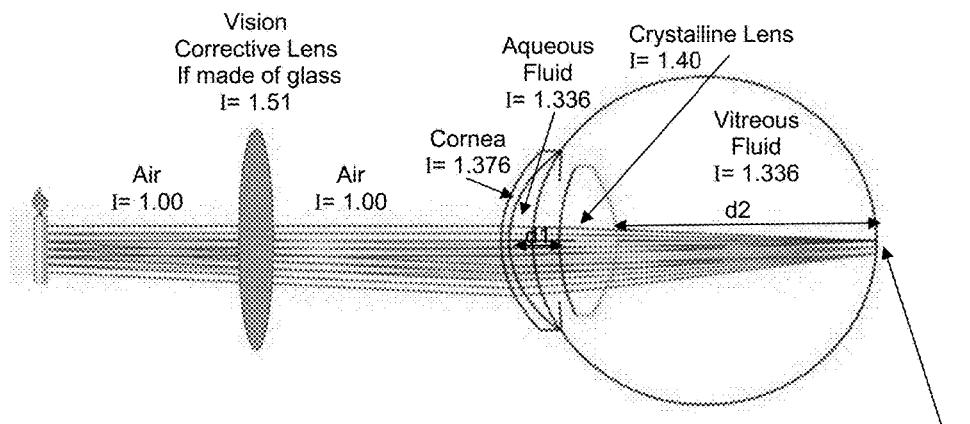
FIG. 13a shows optical rays traveling through eyeglasses into an eye.
Figure 13B:
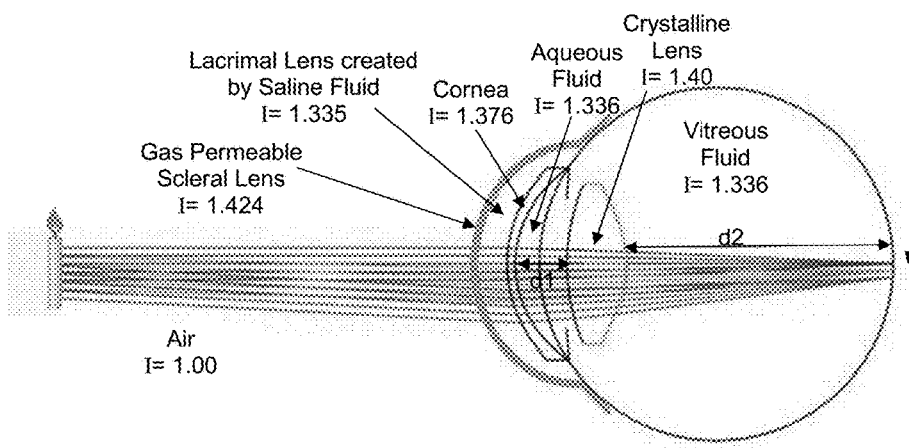
FIG. 13b shows optical rays traveling through a scleral lens into an eye.
Figures 14A, 14B:
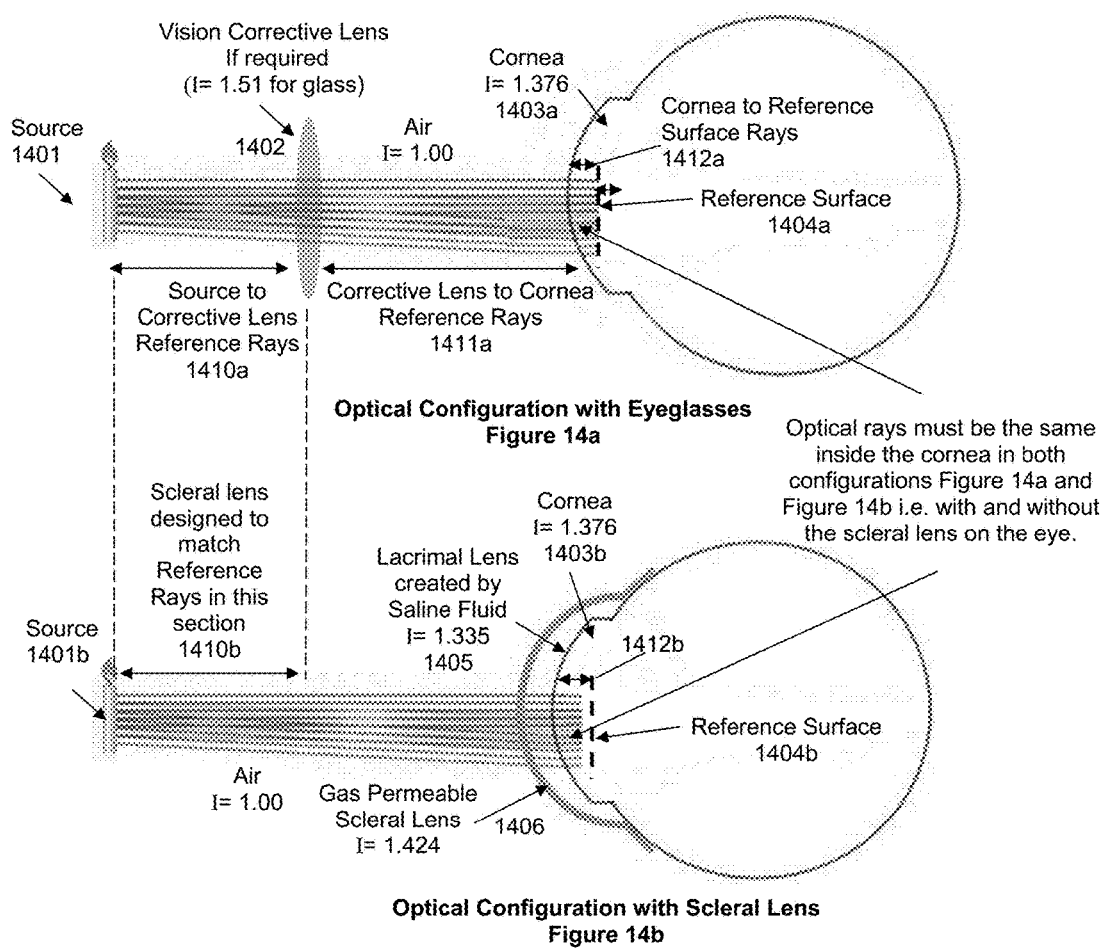
FIGS. 14a and 14b shows relationship between eyeglass and scleral lens optical rays.

Alternatively, if the patient wears eyeglasses, or requires a corrective lens placed in front of the eye to produce a sharp image on their retina, then this vision correction function can be incorporated into the scleral lens optics. The scleral lens must be designed such that when it is placed on the eye, it recreates the same image on the retina as is formed by the corrective lens placed in front of the eye as shown in FIGS. 12a and 12b. Therefore, the total light bending properties between the object (candle in FIGS. 12a and 12b) and retina must be the same for both optical configurations illustrated in FIGS. 12a and 12b. FIGS. 13a and 13b describe these two optical configurations in more detail with the image projected onto the retina being the same again for both configurations. The only difference between FIGS. 13a and 13b is what happens outside the eye in front of the cornea. Since in both configurations nothing within the patient's eye changes and in both configurations a sharp image must be projected onto the retina, one can conclude that the optical rays within the cornea must be the same in FIG. 13a without the scleral lens, as in FIG. 13b with the scleral lens, to produce an in-focus image on the retina. Therefore, the optical rays only need to be matched up to the interior side of the cornea as illustrated in FIGS. 14a and 14b.

Furthermore, it is reasonable to assume that these optical rays need only to be matched over the fixed gaze viewing angle of the eye which is typically +/−10 degrees for text and +/−30 degrees for shape, as given in Xthona, A., "Optimizing Image Quality in the Radiologist's Field of Vision", Barco Healthcare, 3 Nov. 2015, and as illustrated in FIG. 15.

Figure 17:
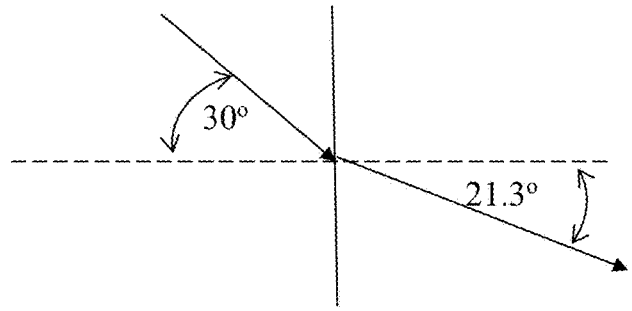
FIG. 17 is an illustration of Snell's Law at air-cornea boundary.

The matching of optical rays is accomplished using Snell's law which governs how light bends when it transitions between different materials as illustrated in FIG. 16. Snell's Law is given by:

$$I_i \sin \alpha_i = I_r \sin \alpha_r$$

where: $I_i$=index of refraction of the incident beam material $\alpha_i$=angle of incidence of the incident beam relative to a perpendicular line drawn to the entering surface $I_r$=index of refraction of the refracted beam material $\alpha_r$=angle of incidence of the refracted beam relative to a perpendicular line drawn to the exiting surface When a light ray enters the eye perpendicular to the corneal surface, the angle of incidence ($\alpha_i$) equals zero, and since (sin 0)=0, the light ray is not refracted (bent) and passes straight through the corneal surface. However, when an off axis light ray enters the corneal surface it is bent toward the perpendicular axis. As an example, when no scleral lens is applied to the eye, a light ray with an incident angle of 30 degrees entering the cornea ($I_r$=1.376) from air ($I_i$=1.00), will be bent by 8.7 degrees to an angle of 21.3 degrees inside the cornea as illustrated in FIG. 17.

Figure 18:
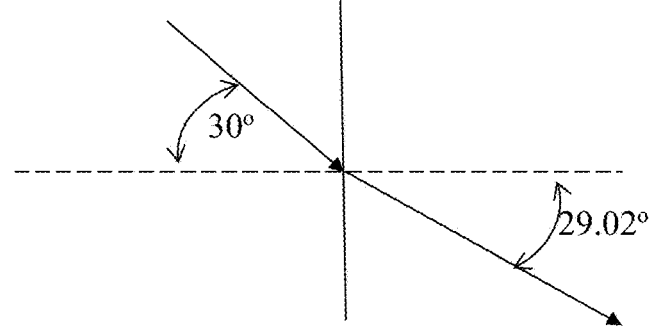
FIG. 18 is an illustration of Snell's Law at saline-cornea boundary.

However, when a scleral lens is applied with saline solution between the back surface of the scleral lens and cornea, a 30-degree incident beam at the saline-cornea boundary is only bent a total of 0.98 degrees, as illustrated in FIG. 18, because there is only a 0.041 difference in the index of refraction between saline ($I_i$=1.335) and the cornea ($I_i$=1.376). Therefore, to place the incoming light ray at the same place inside the cornea, most of the light bending must be performed by the scleral lens at the air-scleral-lens boundary.

Designing a Scleral Lens with Vision Correction Optics

Prior to designing the scleral lens, one must first determine where in the cornea the optical rays are positioned by the corrective lens (eyeglass or refractive lens) to provide good vision. This is accomplished by tracing the optical rays from the source (candle 1401a in FIG. 14a) through the corrective lens 1402, and through the front surface of the cornea 1403a to a three-dimensional reference surface 1404a located within the eye.

The exact position of reference surface 1404a is not important as long as it is a plane or some other known 3D shape entirely located within the eye. However, placing it toward the front of the eye within the cornea simplifies the calculations because the optical rays do not need to be traced past this point. FIG. 14a shows the reference surface 1404a located entirely within the cornea.

The set of optical rays from the source to the reference surface created by the corrective lens is referred to as the "Reference Ray Set" and contains the following ray subsets indicated in FIG. 14a:

1. Source to corrective lens rays 1410a
2. Corrective lens to cornea rays 1411a
3. Cornea to reference surface rays 1412a The degree of light bending by the corrective lens is determined using Snell's law and the known shape of the corrective lens 1402. The degree of light bending at the air-corneal surface is determined using Snell's law and the shape of the cornea 1403a provided by the three-dimensional topographer.

The goal is to design the scleral lens so that it places the optical rays from the source at the same approximate position within the cornea as did the corrective lens, within the limits imposed by Snell's law and the technology used to fabricate the three-dimensional scleral lens surface shape.

To accomplish this goal the following steps are performed (with reference to FIG. 14b):

1. Retrace each optical ray in the Reference Ray Set back out of the eye starting at the interior corneal Reference Surface 1404b and stopping at the cornea-saline fluid boundary 1403b. Reference Surface 1404b in FIG. 14b is the same Reference Surface as 1404a in FIG. 14a redrawn for convenience. Cornea 1403b is the same cornea as 1403a redrawn for convenience.

2. Snell's law is then applied at the cornea (1403b)-saline fluid (1405) boundary to determine how much each optical ray is bent at this boundary. The degree of light bending at the corneal-saline boundary is determined using Snell's law, the index of refraction of the cornea (T=1.376) and the shape of the cornea 1404b as provided by the three-dimensional topographer. Each optical ray then continues at its new projected angle through the saline fluid (1405) to the back surface of the scleral lens 1406.

3. Snell's law is then applied at the scleral lens (1406) back surface-saline fluid (1405) boundary and the scleral lens (1406) front surface-air boundary. The shape of the three-dimensional front and back scleral lens surfaces are adjusted so that the optical rays exiting the front surface of the scleral lens (1406) retraces, as close as possible, within the limits of Snell's law, the equivalent rays in the Reference Ray Set existing between the source 1401*a* and corrective lens 1402, indicated by arrow 1410*a* in FIG. 14*a*. Snell's law is applied using the index of retraction of the saline fluid (I=1.335). When the design is completed the goal is to match rays 1412*a* to 1412*b* inside the eye and match rays 1410*a* and 1410*b* outside the eye, as illustrated in FIGS. 14*a* and 14*b*.

This conceptual scleral lens optical design procedure can be implemented to create actual scleral lens optics to replace eyeglasses worn to correct for nearsightedness. Design performance can be evaluated by superimposing the Reference Ray Set for the eyeglass configuration onto the corresponding optical rays for the scleral lens configuration. The front surface of the scleral lens will bend light more than the back surface for the same incident light angle because the difference in the index of refraction between the scleral lens material (1.424) and saline (1.335) on the back surface is 0.089 and the difference between air (1.00) and the scleral lens material (1.424) on the front surface is 0.424, a factor of 4.7 times greater. It is for this reason that the design example provided uses a spherical shape for the back surface and an aspheric shape for the front surface. However, more complex shapes can be used to achieve closer matches to a Reference Ray Set if desired.

To design the scleral lens:
a. Create a first computer model (FIG. 19*a*) containing an optical source 1901*a*, typically placed at infinity, a corrective lens 1902 that when placed in front of a patient's eye improves their vision, a three-dimensional model of the patient's corneal front surface 1903*a*, and a Reference Surface 1904*a* placed behind the cornea within the eye.
b. Trace optical rays from the source (1901*a*), through air, to the front surface 1902F of the corrective lens 1902, using Snell's law.
c. Knowing the three-dimensional shape of the front (ray entering) surface of the corrective lens 1902F, apply Snell's law at the front surface air-lens boundary to determine the path of the optical rays through the corrective lens 1902.
d. Knowing the three-dimensional shape of the back (ray exiting) surface of the corrective lens 1902B, apply Snell's law at the back-surface-air boundary to determine the path of the optical rays from the back surface of the corrective lens 1902 to the front surface of the cornea 1903*a*.
e. Determine the path of the optical rays from the front surface of the cornea 1903*a* to a Reference Surface 1904*a* placed within the eye. Knowing the three-dimensional shape of the front surface of the cornea, apply Snell's law at the front surface air-cornea boundary and at any material boundaries within the eye lying between the cornea and the Reference Surface. The Reference Surface can be planar or curved. If the Reference Surface is placed within the cornea, as drawn in FIG. 19*a* then the only boundary encountered will be the air-cornea boundary.
f. Store the path of the optical rays traveling from the source 1901*a* to the Reference Surface 1904*a* and refer to this set of rays as the Reference Ray Set.
g. Create a second computer model, FIG. 19*b*, containing the same identical optical source 1901*b*, eye 1903*b*, and Reference Surface (1904*b*) as in the first computer model, where optical source 1901*b* is identical to optical source 1901*a*, eye 1903*b* is identical to eye 1903*a*, and Reference Surface 1904*b* is identical to Reference Surface 1904*a*. Place the optical source 1901*b* the same distance from the eye as in the first computer model. Place the Reference Surface at the same location within the eye as in the first computer model.
h. Place a scleral lens 1906 over the eye in the second computer model, FIG. 19*b*, filling the gap between the cornea and back surface of the scleral lens with fluid 1905, typically saline.
i. Insert the three-dimensional optical rays from the Reference Ray Set that lie inside the eye between the cornea 1903*a* and Reference Surface 1904*a* in the first computer model, FIG. 19*a*, into the second computer model, FIG. 19*b*, placing the rays at the identical position within the eye 1903*b* as in the first computer model. For the purpose of designing the scleral lens it is now assumed that the rays originate at the Reference Surface 1904*b* and travel out of the eye 1903*b*, through the fluid 1905, through scleral lens 1906 and out the front of the scleral lens toward the source 1901*b*.
j. Knowing the three-dimensional shape of the front surface of the cornea 1903*b*, the three-dimensional shape of the cornea-fluid boundary, the index of refraction of the cornea (typically 1.376), and the index of refraction of the fluid (typically 1.336 for saline), apply Snell's law to the cornea-(saline) fluid boundary to determine the path of the optical rays from the front surface of the cornea through the fluid 1905 to the back-surface of the scleral lens 1906.
k. Adjust the height of the back surface of the scleral lens, indicated by H2 (1107) in FIG. 11, to vault over the cornea. Vaulting height is not critical, but is typically less than 300 microns.
l. Apply Snell's law, in the second computer model, to the front and back surfaces of the scleral lens, surfaces 2006F and 2006B respectively, shown in zoomed in view FIG. 20, adjusting the three-dimensional shape of the front and back surface of the scleral lens optics so that the angles and positions of the scleral lens rays, 1908*b* shown in FIG. 19*b*, approximate as closely as possible, within the limits imposed by Snell's law, the path traveled by the Reference Ray Set (1907*a*) between the source and corrective lens in the first computer model, as shown by arrows 1908*a* in FIG. 19*a*. That is, 1908*b*≈1908*a*.

Figure 21:
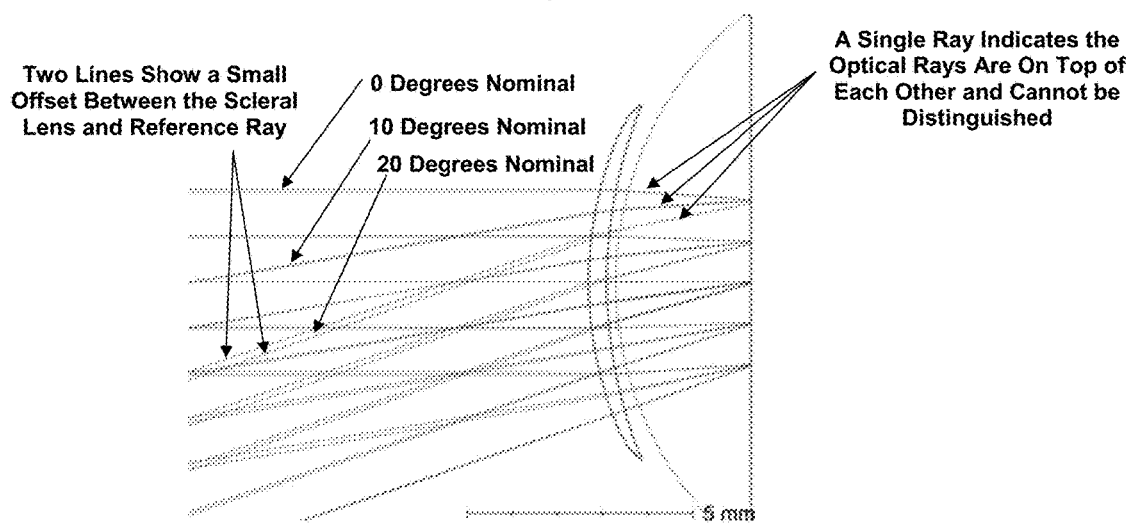
FIG. 21 is an enlarged superposition of FIGS. 19a and 19b, showing the relationship between optical rays close to the eye.

FIG. 21 is the superposition of the examples of FIGS. 19*a* and 19*b* zoomed in around the cornea and enlarged to show how well the optical rays from the Scleral Lens design match the Reference Ray Set from the corrective lens configuration. Optical rays are shown entering the eye at approximately 0, 10, and 20 degrees relative to a line perpendicular to the front surface of the cornea.

Figure 22A:
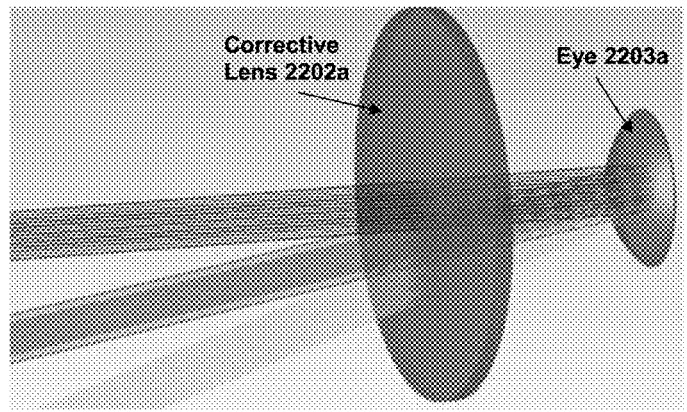
Figure 22B:
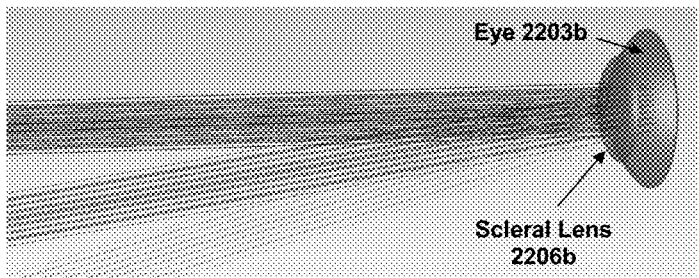
FIG. 22b is the three-dimensional representation of FIG. 19b.

FIG. 22*a* is the three-dimensional representation of FIG. 19*a* and is the first three-dimensional model that is needed by the computer to design the scleral lens. FIG. 22*b* is the three-dimensional representation of FIG. 19b and is the second three-dimensional model that is needed by the computer to design the scleral lens.

Figure 19:
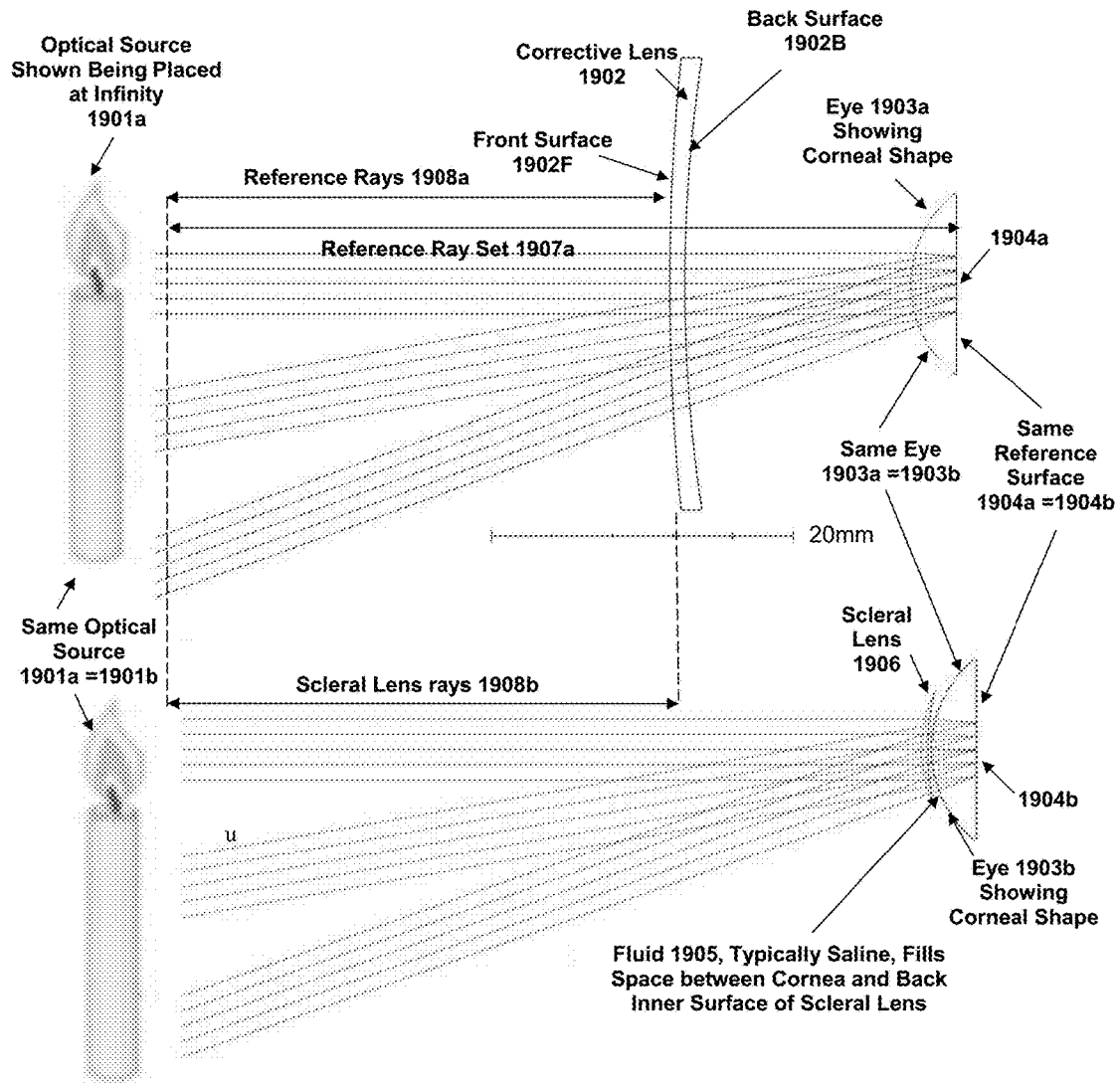
FIGS. 19a and 19b show the first and second computer model required to design scleral lens optics.
Figure 20:
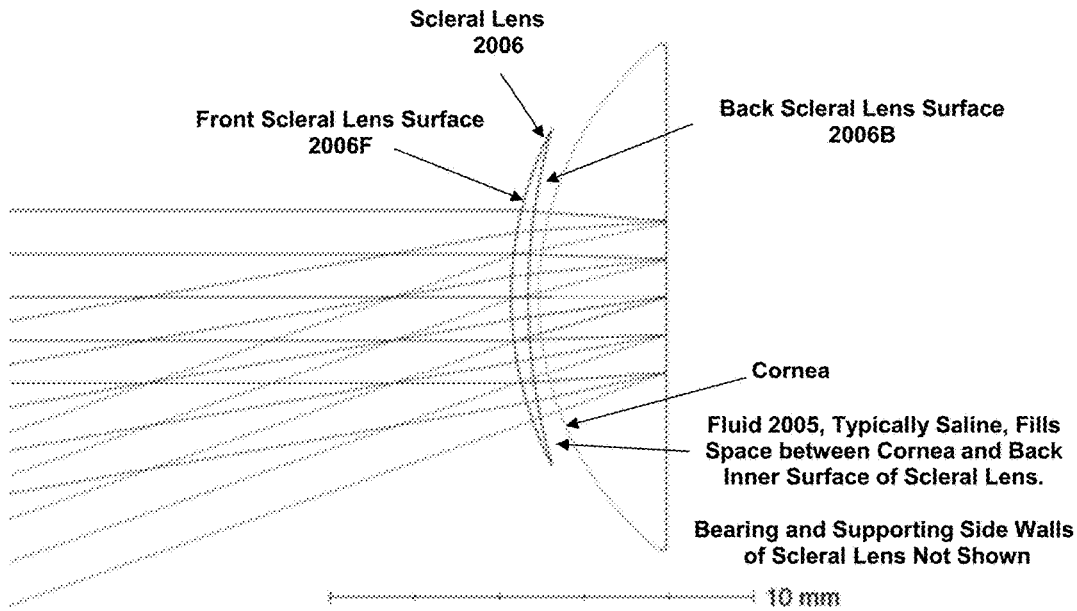
FIG. 20 is an enlarged section of FIG. 19b showing optical rays close to eye.
Figure 22C:
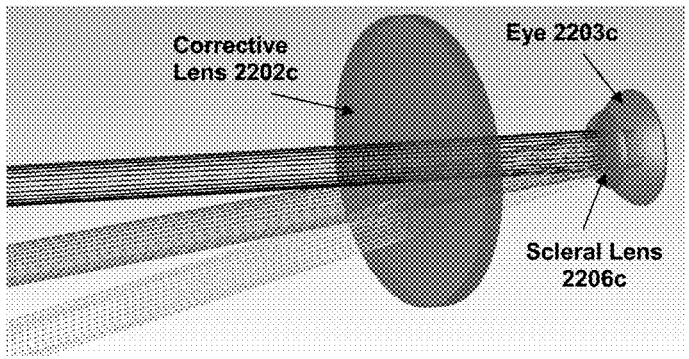
FIG. 22c is the superposition of FIG. 22a and FIG. 22b, showing the relationship between optical rays.

FIG. 22c is the superposition of the examples of FIGS. 22a and 22b showing the alignment of the ray bundles and more specifically how well the scleral lens is able to duplicate the Reference Ray Set. For the design example illustrated in FIGS. 19 through 22, the front surface curvature 1902F of corrective lens 1902 in FIG. 19 is 150 mm and the back-surface radius of curvature 1902B is 100 mm. The scleral lens 2006 in FIG. 20 has a back surface spherical radius of curvature 2006B equal to 10.64 mm. The front surface of scleral lens 2006 is an even Asphere with a radius of 38.473 mm, a conic of −4.75 mm, $2^{nd}$ order term of 0.058, $4^{th}$ order term of 0.000623, $6^{th}$ order term of −0.0001804, 8th order term of 0.00003288, $10^{th}$ order term of −2.947E-6, and $12^{th}$ order term of 1.06E-7. The parameters used to specify an aspheric surface are described in an article by Czajkowski, A., entitled "Specifying an Aspheric Surface," OPT 521—Report #2, Dec. 14, 2007.

While there are numerous ray tracing and lens design programs on the market, the design shown in FIGS. 19 through 22 was generated by a ray tracing lens design program called "Opticstudio" produced by Zemax LLC, of Kirkland, Wash.

Figure 23A:
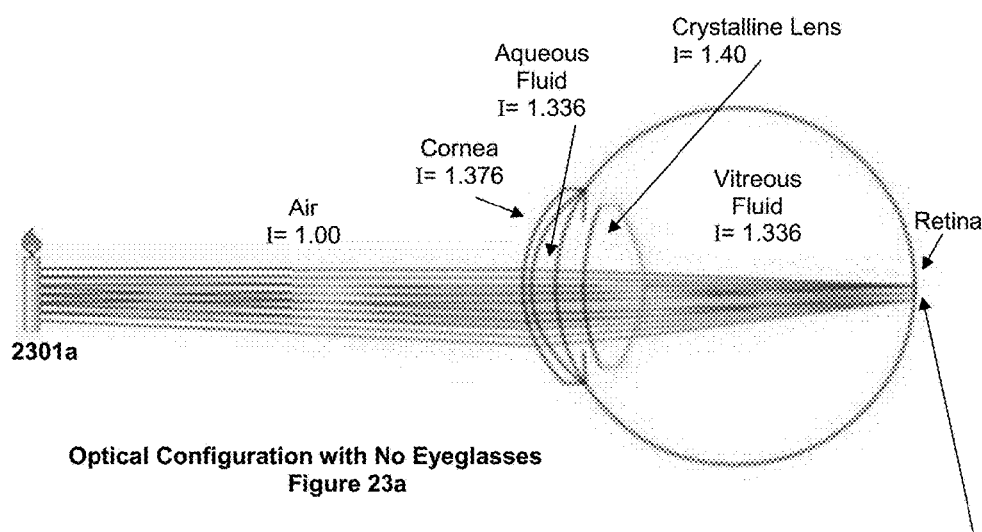
FIG. 23a shows optical rays traveling through air into an eye.
Figure 23B:
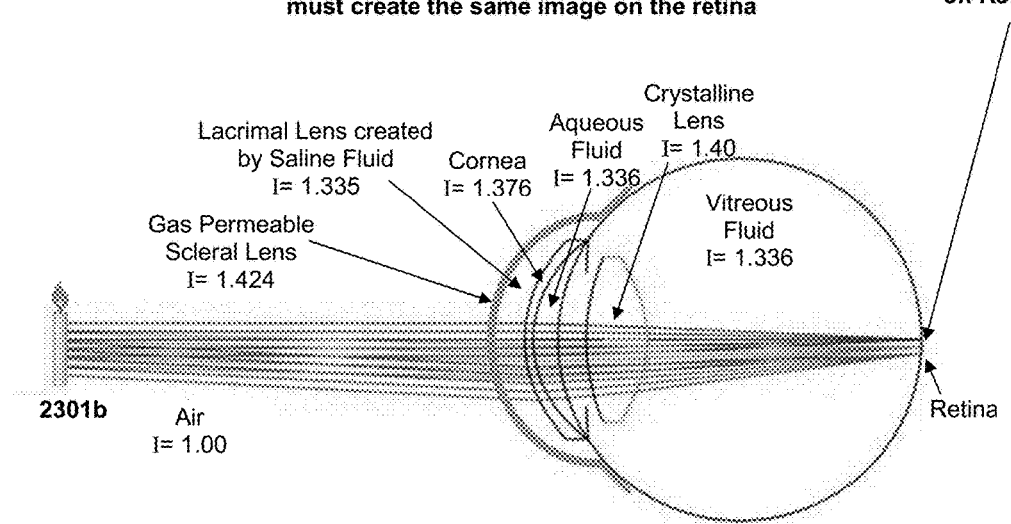
FIG. 23b shows optical rays traveling through a scleral lens into an eye.

Designing a Scleral Lens for Patient that do not Require Vision Correction Optics Having described how to incorporate corrective lens optics into a scleral lens to eliminate the need for eyeglasses, we will now describe how to design a scleral lens for patients who do not require corrective lens optics or eyeglasses to produce a sharp image on their retina, but want to wear scleral lenses to relieve dry eye symptoms or for any other reason. FIG. 23a illustrates the patient's eye focused on an object 2301a (typically placed at infinity). It is assumed that the patient sees the object clearly. FIG. 23b shows a scleral lens 2304a placed on the eye. The scleral lens must be designed to maintain the same quality of vision when applied to the eye as was obtained prior to its application. The goal is to project the same image onto the retina in FIG. 23b as in FIG. 23a, within the limits of Snell's law. As explained previously, and referring to FIGS. 24a and 24b, this can be achieved by matching the optical rays inside the eye to a reference surface (2412a and 2412b). The Reference Surface can be placed anywhere inside the eye behind the surface of the cornea (in front of, within, or behind the crystalline lens). In addition to matching the optical rays inside the eye, the optical rays are also matched outside the eye prior to and after application of the scleral lens. Matching rays outside the eye correspond to matching Reference Rays 2410a to rays 2410b. Therefore, optical rays 2410a≈2410b and 2412a≈2412b within the limits imposed by Snell's law and the scleral lens manufacturing process. The precise steps required to design such a scleral lens will now be described in the second design example.

As in the first example, the back surface of the scleral lens will be made spherical and the front surface aspheric in shape. More complex shapes can be used to achieve closer matches to the Reference Ray Set if desired. To design the scleral lens:

a. Create a first computer model (FIG. 25a) containing an optical source 2501a, preferably placed at infinity, the patient's eye (2502a) a three-dimensional model of the patient's corneal front surface 2503a, obtained from a topographer, and a Reference Surface 2504a placed behind the cornea within the eye.

b. Trace optical rays from the source (2501a), through air, to the front surface of the cornea 2503Fa.

c. Determine the path of the optical rays from the front surface of the cornea 2503Fa to a Reference Surface 2504a placed within the eye. Knowing the three-dimensional shape of the front surface of the cornea 2503Fa, supplied by the topographer, apply Snell's law at the front surface air-cornea boundary and at any material boundary within the eye lying between the cornea and the Reference Surface 2504a. The Reference Surface can be planar or curved.

d. Store the three-dimensional path of the optical rays traveling from the source 2501a to the Reference Surface 2504a and refer to this set of rays as the Reference Ray Set 2507a.

e. Create a second computer model, FIG. 25b, containing the same identical optical source 2501b, eye 2502b, and Reference Surface (1904b) as in the first computer model, where optical source 2501b is identical to optical source 2501a, eye 2502b is identical to eye 2502a, cornea 2503a is identical to cornea 2503b, and Reference Surface 2504b is identical to Reference Surface 2504a. Place the optical source 2501b the same distance from the eye as in the first computer model. Place the Reference Surface 2504b at the same location within the eye as in the first computer model.

f. Place a scleral lens 2506 over the eye in the second computer model, FIG. 25b, filling the gap between the cornea and back surface of the scleral lens with fluid 2505, typically saline.

g. Insert the three-dimensional optical rays from the Reference Ray Set that lie inside the eye between the cornea 2503a and Reference Surface 2504a in the first computer model, FIG. 25a, into the second computer model, FIG. 25b, placing the rays in the identical location within the eye 2503b as in the first computer model. For the purpose of designing the scleral lens it is now assumed that the rays originate at the Reference Surface 2504b and travel out of the eye 2502b, through the front surface of the cornea 2503Fb, through the fluid 2505, through scleral lens 2506 and out the front of the scleral lens.

h. Knowing the three-dimensional shape of the front surface of the cornea 2503b, the three-dimensional shape of the cornea-fluid boundary, the index of refraction of the cornea (typically 1.376), and the index of refraction of the fluid (typically 1.336 for saline), apply Snell's law to the cornea-(saline) fluid boundary to determine the path of the optical rays from the front surface of the cornea 2503F through the fluid 2505 to the back-surface of the scleral lens 2506.

i. Adjust the height of the back surface of the scleral lens, indicated by H2 (1107) in FIG. 11, to vault over the cornea. Vaulting height is not critical, but is typically less than 300 microns.

j. Apply Snell's law, in the second computer model, to the front and back surfaces of the scleral lens, surfaces 2606F and 2606B respectively, (shown in zoomed in view FIG. 26). This involves adjusting the three-dimensional shape of the front and back surface of the scleral lens optics so that the optical rays 2508b between the front surface of the scleral lens and source, shown in FIG. 25b, approximate as closely as possible, within the limits imposed by Snell's law, the path traveled by the Reference Ray Set between the source and cornea in the first computer model, shown by rays 2508*a* in FIG. 25*a*. Stop the matching of rays 2508*b* to 2508*a* at the front of the scleral lens.

Figure 26:
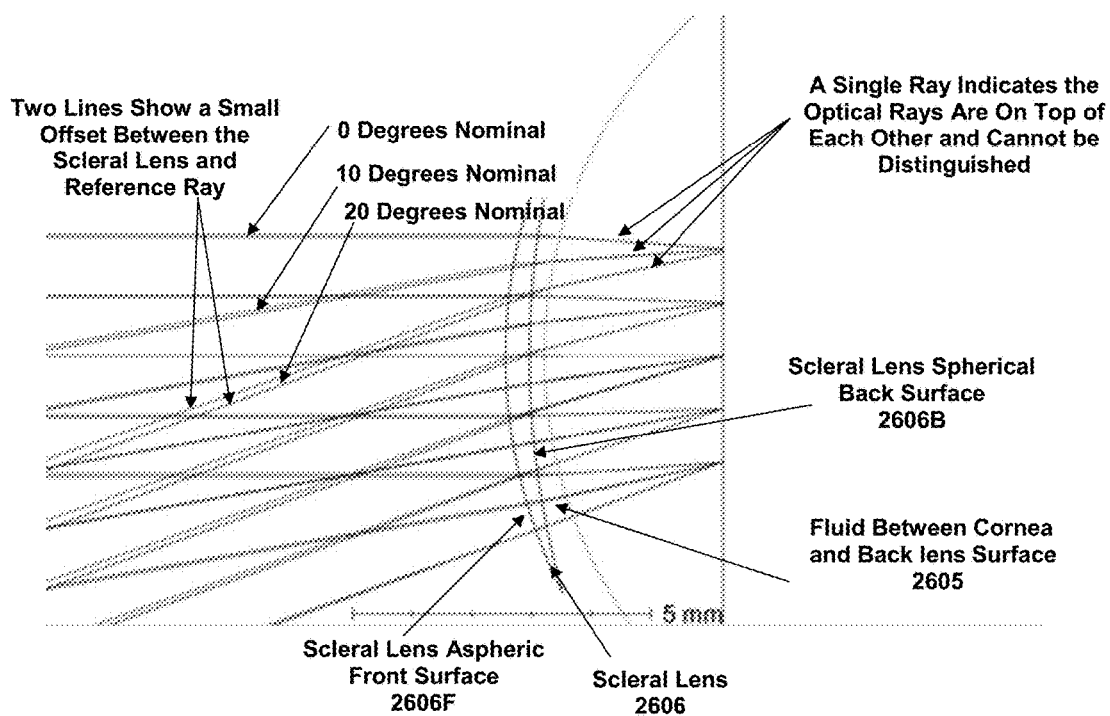
FIG. 26 is an enlarged superposition of FIGS. 25a and 25b, showing the relationship between optical rays close to the eye.

FIG. 26 is the superposition of FIGS. 25*a* and 25*b* zoomed in around the cornea and enlarged to show how well the optical rays from the Scleral Lens design match the Reference Ray Set computed without the scleral lens on the eye. Optical rays are shown emanating 0, 10, and 20 degrees from a source located at infinity.

Figure 27A:
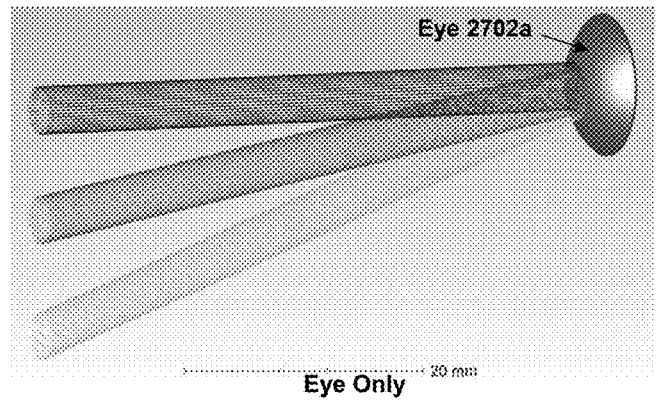

FIG. 27*a* shows the actual first three-dimensional computer model used to calculate the Reference Ray Set, with three optical ray bundles emanating 0, 10, and 20 degrees from the source at infinity. FIG. 27*a* is the three-dimensional drawing corresponding to the two-dimensional drawing shown in FIG. 25*a*.

Figure 27B:
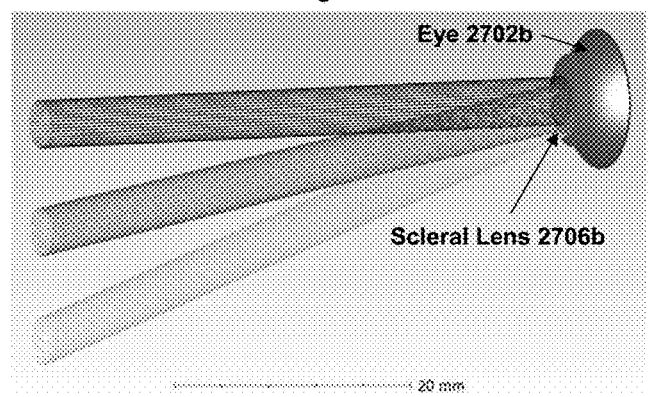
FIG. 27b is the three-dimensional representation of FIG. 25b.

FIG. 27*b* shows the actual second three-dimensional computer model used to design the scleral lens also with ray bundles emanating at 0, 10, and 20 degrees from the infinity source. FIG. 27*b* is the three-dimensional drawing corresponding to the two-dimensional drawing shown in FIG. 25*b*.

Figure 27C:
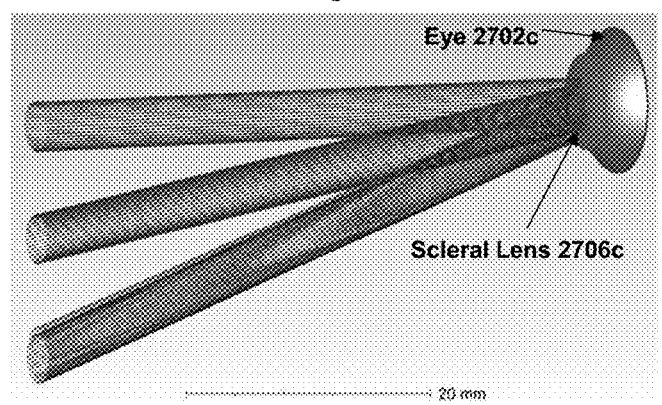
FIG. 27c is the superposition of FIG. 27a and FIG. 27b, showing the relationship between optical rays.

FIG. 27*c* is the superposition of FIGS. 27*a* and 27*b* showing how well the optical rays from the scleral lens design are able to duplicate the Reference Ray Set. For the scleral lens design shown in FIGS. 25 through 27, the back surface has a spherical radius of curvature equal to 16.473 mm. The front surface is an Even Asphere with a Radius of 8.866 mm, a conic of −0.053, $2^{nd}$ order term of −1.727E-4, $4^{th}$ order term of 1.251E-4, $6^{th}$ order term of −6.553E-5, 8th order term of 9.107E-6, $10^{th}$ order term of −4.023E-7 and $12^{th}$ order term of 0.0.

While there are numerous ray tracing and lens design programs on the market, the models shown in FIGS. 25 through 27 were generated by a ray tracing lens design program called Opticstudio by Zemax LLC of Kirkland, Wash. Again, it is emphasized that FIGS. 25 through 27 correspond to the design of a real scleral lens.

Manufacturing the Scleral Lens

Once the scleral lens optics, bearing surface shape, and vaulting height are specified, such lenses can be manufactured either by using a precision lathe or by using a 3D printer. An example of a precision lathe is the "Nanoform X" manufactured by Ametek Precitech, Inc. of Keene, N.H. An example of a precision 3D printer is the "Photonic Professional GT" by Nanoscribe GmBH of Eggenstein-Leopold Shafen, Germany.

In addition to the scleral lenses previously described herein, there exists a class of scleral lenses that incorporate a soft material, such as, for example, a silicone hydrogel, for the bearing surface. Such pliable materials, frequently referred to as "skirts" conform to the shape of the eye in the bearing region. A rigid optical lens, vaulting over the cornea, is supported by the soft conforming skirt. An example of a scleral lens with a soft skirt is manufactured by SynergEyes, Inc. of Carlsbad, Calif.

Scleral lens optics designed using the procedure described herein can also be combined with a soft skirt or incorporated into a pliable bearing surface lens, thereby greatly reducing the time and complexity of such scleral lens design.

System Implementation

Figure 28:
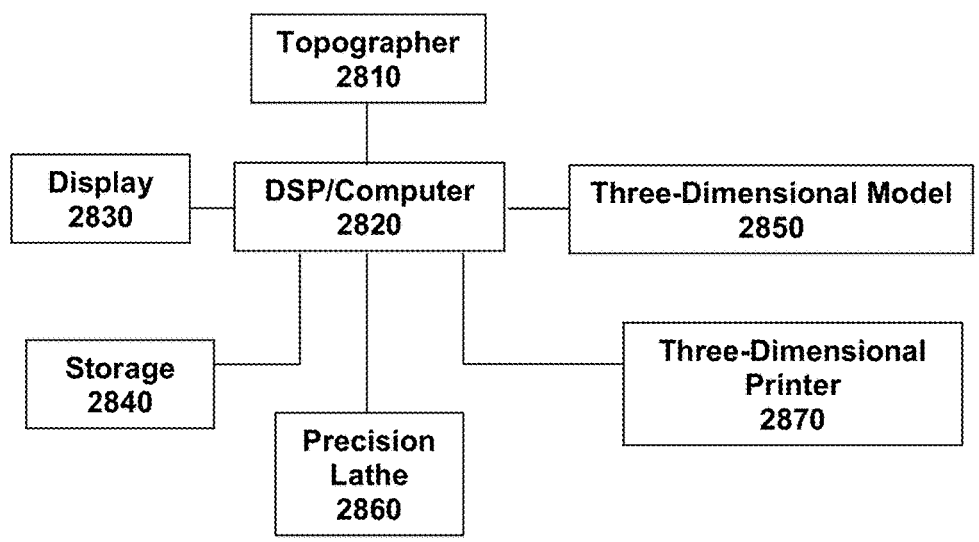
FIG. 28 is a block diagram of a preferred embodiment of a system that may be used to implement the methods described herein.

FIG. 28 is a block diagram of a preferred embodiment of a system 2800 that may be used to implement the methods described herein.

This implementation uses a topographer 2810, a Digital Signal Processor (DSP)/computer 2820, a display 2830, and data storage 2840 to process and/or generate one or more three-dimensional model(s) 2850 of an eye and/or the resulting lens. The lens model(s) may then be provided to a precision lathe 2860 and/or 3D printer 2870 to produce a physical lens.

As explained in the above-referenced U.S. Pat. No. 9,398,845 by Bishop et al., the topographer 2810 may use a video camera and a line scan device to obtain a 3D model of an eye. Other topographers, as described in the above-referenced U.S. Pat. No. 9,489,753 by Bishop et al. use Optical Coherent Topography to measure eye topology. Furthermore, there are topographers that project patterns onto the eye and measure pattern distortion to determine corneal shape, such as the Placido Disc topographers. Other topographers insert fluorescent dyes into the eye and project patterns onto the fluorescing material to determine the shape of the eye. For the applications described herein, any topographer that compensates for eye motion during the scan to provide motion corrected blur fee topology can be used. The topographer 2810 thus typically includes a number of components (not shown in detail here) such as a two dimensional (2D) digital video camera to take a sequence of images of an eye including at least one feature on the eye. The camera may be a television camera or other digital camera capable of capturing a sequence of images. The topographer 2810 also includes a scanner that measures distances to the surface of the eye to produce a set of independently measured data points in 3D space—that is, each "pixel" in the sequence of camera images is thus associated with an x, y, z location on the surface of the eye.

The DSP/computer 2820 may further include storage 2840, a display 2830 and/or other peripheral components.

The DSP/computer 2820 executes program code to perform some or all of the steps of the methods described herein for determining the design of a lens.

One or more three-dimensional models 2850 specifying a lens design may then be provided as output data files to a lens manufacturing machine (or process) such as the precision lathe 2860 or the 3D printer 2870.

It should be understood that many other arrangements of the programmable and/or computer controlled components are possible. For example, the DSP/computer 2820 shown here may act as both the computer for the topographer as well as the platform that executes the lens design method described herein. In other arrangements, the topographer 2810 may have its own DSP and/or computer arranged to operate on the output of the camera and the scanner to produce topology data points from the eye with a separate DSP/computer executing the lens design procedure. Scanned eye data from the topographer may be transferred in the form of a data file that is transferred over a network, or on a portable storage media such as a memory stick, disk, or magnetic tape, to the lens design computer. The precision lathe 2860 and/or 3D printer 2870 may typically have their own processors and may be located remotely from the DSP/computer 2820, and operate on 3D model designs provided to them in the form of a data file that is transferred over a network, or on a portable storage media such as a disk or magnetic tape. The DSP/computer may also directly control a local or remote precision lathe 2860 and/or 3D printer 2870 over a network connection. Still other arrangements are possible.

What is claimed is:

1. A method for designing and manufacturing a lens, the lens comprising a front surface and a back surface, the method comprising:

a. operating an ocular topographer to provide a three-dimensional (3D) model of an eye specified as an array of pixel data points including at least a three dimensional (3D) position of each pixel data point
with
b. each pixel data point representing an x, y, z location on a surface of an eye and a corresponding intensity value for each pixel data point,
c. the spatial relationship between the pixel data points in the 3D model accurately representing clinically visual anomalies in the eye, compensated for artifacts caused by saccadic eye motion and random eye motion that occur during acquisition of the pixel data points,
d. a sampling density of the pixel data points used from the topographer being sufficiently high to characterize the one or more clinically visual anomalies in the eye and further characterizing at least one of a pupil, iris, or blood vessel,
e. determining, from the data points used from the topographer, an array of independent data points to define the back surface of the lens, with the density of the independent data points that define the back surface of the lens being sufficiently high to enable adjustment in the back surface of the lens for said anomalies in the eye,
f. such that the resulting lens is a contact lens that conforms to or vaults over said anomalies in the eye, and
g. three-dimensional printing or machining of the contact lens using the design
additionally comprising:
determining characteristics of the lens including:
an optical region, a transition region, and a bearing surface,
the optical region focusing incoming light into an eye,
the transition region connecting the optical region to the bearing surface,
the bearing surface comprising a region of the lens that rests on a surface of an eye,
and such that
the resulting lens is a scleral lens that conforms to or vaults over said anomalies,
lens optics in the optical region are vaulted over a cornea of the eye to create a fluid reservoir between a back surface of the lens optics and the cornea,
the bearing surface either (i) resting solely on a sclera and conforming to a three-dimensional shape of the sclera, or (ii) straddling a limbus, such that the bearing surface rests partially on and conforms to the three-dimensional shape of sclera and rests partially on and conforms to a three-dimensional shape of the cornea, and
the bearing surface intentionally raised over at least one area in the eye topology under the lens bearing surface, and/or at least one raised gap formed in the bearing surface, to allow free flow of tears in and out of a region covered by the lens.

2. The method of claim 1 additionally comprising:
determining, from the data points used from the topographer, a lens back surface with quadrant or sub-division boundaries defined by multiple independent data points, with additional independent data points within each quadrant or sub-division that are not used to define the boundaries, and with a density of independent data points within each quadrant or sub-division being sufficiently high so as to characterize anomalies anywhere in the quadrant or sub-division.

3. A method for designing and manufacturing a lens including one or more characteristics of a lens optics without applying a trial lens to a patient's eye,
comprising:
a. creating a first computer model containing an optical source, an eye with a three-dimensional model of a corneal front surface of the patient's eye as provided by a topographer in which three-dimensional data point positions of the eye are extracted from the topographer, and a Reference Surface placed behind the corneal front surface within the eye, where the Reference Surface may be planar or curved, and further:
   i. when the patient requires corrective lenses, or eyeglasses, to produce a sharp image on their retina:
      inserting a corresponding corrective lens between the optical source and eye in the first computer model;
      tracing rays from the optical source, through air, to a front surface of the corrective lens;
      using the three-dimensional shape of the front surface of the corrective lens, applying Snell's law at a front surface air-lens boundary to determine a path of the optical rays within the corrective lens; and
      using the three-dimensional shape of a back surface of the corrective lens, applying Snell's law at a back-surface lens-air boundary to determine a path of the optical rays as they travel from the back surface of the corrective lens to the front surface of the cornea;
   ii. when the patient does not require corrective lenses, or eyeglasses, to produce a sharp image on their retina, then without inserting a corrective lens into the first computer model:
      tracing optical rays directly from the optical source, through air, to the front surface of the cornea;
   iii. determining a path of the optical rays from the front surface of the cornea to a Reference Surface placed within the eye, and using the three-dimensional shape of the front surface of the cornea and the Reference Surface, applying Snell's law at the front surface air-cornea boundary and at any material boundaries within the eye lying between the cornea and the Reference Surface; and
   iv. storing the path of the optical rays traveling from the source to the Reference Surface as a Reference Ray Set;
b. creating a second computer model containing the same optical source, eye, and Reference Surface as in the first computer model, by placing the optical source the same distance from the eye as in the first computer model, and placing the Reference Surface at the same location within the eye as in the first computer model, and within the second computer model further:
   i. placing a scleral lens over the eye in the second computer model, and filling a gap between the cornea and back surface of the scleral lens with a model of a fluid;
   ii. inserting a subset of optical rays from the Reference Ray Set that lie inside the eye between the cornea and Reference Surface in the first computer model into the second computer model, and placing the rays of this subset in the identical location within the eye as in the first computer model;
   iii. assuming the rays in the second computer model now originate at the Reference Surface and travel out of the eye, and using the three-dimensional shape of the front surface of the cornea, the index of refraction of the cornea, and the index of refraction of the fluid, applying Snell's law to the cornea-fluid boundary to determine the path of the optical rays as they travel from the front surface of the cornea through the fluid to the back surface of the scleral lens;

iv. when the first computer model contains a corrective lens:

applying Snell's law to the front and back surfaces of the scleral lens optics, adjusting the three-dimensional shape of the front and back surfaces of the lens so that the optical rays in the second computer model approximate, as closely as possible within the limits specified by Snell's Law, the optical rays in the first computer model, over a shared region specified by the Reference Ray Set between the optical source and corrective lens in the first computer model;

v. when the first computer model does not contain a corrective lens:

applying Snell's law to the front and back surfaces of the scleral lens optics, adjusting the three-dimensional shape of the front and back surfaces of the lens so that the optical rays in the second computer model approximate, within the limits specified by Snell's Law, the subset of the Reference Rays in the first computer model, over the shared region specified by the distance between the front surface of the scleral lens and optical source in the second computer model;

and further wherein the lens optics are installed into an optical region of a scleral lens, and the method further comprising:

determining characteristics of the scleral lens, including:

an optical region, a transition region, and a bearing surface, the optical region focusing incoming light into the eye, the transition region connecting the optical region to the bearing surface, the bearing surface comprising a region of the lens that rests on a surface of an eye, the bearing surface further defined as an array of independent data points conforming to the three-dimensional data point positions of the eye extracted from the topographer, and with each data point used from the topographer representing an independently measured x, y, z location on the surface of the eye, a spatial relationship between the data points used from the topographer accurately representing a true topology of the eye, compensated for saccadic or motion blur artifacts that occur during acquisition of the data points, a sampling density of the data points used from the topographer and a sampling density of the data points on the bearing surface of the lens being sufficiently high to characterize anomalies anywhere in the eye, and such that the resulting lens is a scleral lens that conforms to or vaults over said anomalies anywhere on the eye, lens optics in the optical region are vaulted over a cornea of the eye to create a fluid reservoir between a back surface of the optics and the cornea, the bearing surface either (i) resting solely on a sclera and conforming to a three-dimensional shape of the sclera, or (ii) straddling a limbus, such that the bearing surface rests partially on and conforms to the three-dimensional shape of sclera and rests partially on and conforms to a three-dimensional shape of the cornea, and with the bearing surface intentionally raised over at least one area in the eye topology under the lens bearing surface, and/or at least one raised gap formed in the bearing surface, to allow free flow of tears in and out of a region covered by the lens; and three-dimensional printing or machining of the contact lens using the design.

4. The method of claim 1, wherein the 3D model is further compensated for artifacts caused by saccadic eye motion and random eye motion by the additional steps of:

providing the 3D position information from multiple scan operations of a 3D scanner, providing the corresponding intensity values from a 2D camera image captured with each scan operation of the 3D scanner transformed into the 3D model, and maintaining a fixed spatial relationship between the 3D scanner and the 2D camera to enable precise mapping of intensity values from the 2D image to locations in the 3D model, the intensity values in the 2D images provided by the 2D camera representing the one or more clinically observable anomalies in the eye and further characterizing at least one of a pupil, iris or blood vessel.

5. The method of claim 1 wherein the 3D model of the eye is additionally obtained by the further steps of:

creating a plurality of 3D models for each of two or more gazes, the plurality of 3D models each including an array of pixel data points, each pixel data point including an x, y, z position, and a corresponding intensity value derived from a corresponding 2D video camera image;

locating at least one visual feature in common to at least two of the 3D models; and stitching the 3D models together at the x, y, z position.

6. The method of claim 3 wherein the Reference Surface is located behind the cornea.

* * * * *